US012810784B2

(12) United States Patent
Kim et al.

(10) Patent No.: US 12,810,784 B2
(45) Date of Patent: Nov. 24, 2026

(54) STAGE CIRCUIT AND DISPLAY DEVICE INCLUDING THE SAME, AND ELECTRONIC DEVICE

(71) Applicant: Samsung Display Co., Ltd., Yongin-si (KR)

(72) Inventors: Hyeong Seok Kim, Yongin-si (KR); Kyung Ho Kim, Yongin-si (KR); Byung Chang Yu, Yongin-si (KR); Yun Mi Kim, Yongin-si (KR); Do Yeong Park, Yongin-si (KR); Jin Joo Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/205,843

(22) Filed: May 12, 2025

(65) Prior Publication Data

US 2025/0391337 A1 Dec. 25, 2025

(30) Foreign Application Priority Data

Jun. 19, 2024 (KR) ........................ 10-2024-0079886
Dec. 13, 2024 (KR) ........................ 10-2024-0185380

(51) Int. Cl.
*G09G 3/32* (2016.01)

(52) U.S. Cl.
CPC ....... *G09G 3/32* (2013.01); *G09G 2310/0267* (2013.01); *G09G 2320/0233* (2013.01)

(58) Field of Classification Search
CPC .... G09G 3/20; G09G 3/32; G09G 2310/0267; G09G 2320/0233; G09G 2310/0286; G09G 3/3266
See application file for complete search history.

(56) References Cited

U.S. PATENT DOCUMENTS

| | | | | |
|---|---|---|---|---|
| 7,414,599 | B2 | 8/2008 | Chung et al. | |
| 2015/0262703 | A1 | 9/2015 | Murakami et al. | |
| 2021/0056910 | A1 | 2/2021 | Chung et al. | |
| 2021/0104197 | A1* | 4/2021 | Choi | G11C 19/184 |
| 2022/0108656 | A1* | 4/2022 | Lee | G09G 3/3275 |
| 2023/0197011 | A1* | 6/2023 | Hong | G09G 3/3233 345/212 |
| 2023/0326388 | A1 | 10/2023 | In et al. | |
| 2023/0326411 | A1 | 10/2023 | In et al. | |

FOREIGN PATENT DOCUMENTS

| | | | |
|---|---|---|---|
| KR | 10-0560780 | B1 | 3/2006 |

* cited by examiner

*Primary Examiner* — Muhammad N Edun

(74) *Attorney, Agent, or Firm* — Womble Bond Dickinson (US) LLP

(57) ABSTRACT

A stage circuit includes a controller connected to first and second powers, and configured to control a voltage of a connection control line in response to carry signals of first and second carry input terminals, a driver connected to the first power and to a third power, and configured to control voltages of first and second nodes, first outputs configured to receive one of scan clock signals or output enable scan signals based on a voltage of one of local nodes, connection portions configured to control an electrical connection between the local nodes and the first node in response to the voltage of the connection control line, and a reset connected between the connection control line and a fourth power, and configured to control an electrical connection between the connection control line and the fourth power based on the voltage of the second node.

20 Claims, 12 Drawing Sheets

STAGE CIRCUIT AND DISPLAY DEVICE INCLUDING THE SAME, AND ELECTRONIC DEVICE

CROSS-REFERENCE TO RELATED APPLICATION

The present application claims priority to, and the benefit of, Korean Patent Application No. 10-2024-0079886, filed on Jun. 19, 2024, and Korean Patent Application No. 10-2024-0185380, filed on Dec. 13, 2024, in the Korean Intellectual Property Office, the entire disclosures of which are incorporated herein by reference.

BACKGROUND

1. Field

The present disclosure generally relates to a stage circuit, a display device including the stage circuit, and an electronic device.

2. Description of the Related Art

As the information technology is developed, importance of a display device, which is a connection medium between a user and information, is being highlighted. Accordingly, the use of display devices, such as liquid crystal display devices and organic light-emitting display devices is increasing.

A display device includes pixels, and the pixels may receive a data signal in response to a scan signal supplied from a scan driver, and may emit light at a luminance corresponding to the data signal. The scan driver may include a plurality of stage circuits to supply the scan signal.

SUMMARY

Embodiments provide a stage circuit capable of reducing or minimizing a luminance difference in units of horizontal lines and a display device including the stage circuit, and an electronic device.

In accordance with an aspect of the present disclosure, there is provided a stage circuit including a controller connected to a first power input terminal for receiving a first power and to a second power input terminal for receiving a second power, and configured to control a voltage of a connection control line in response to carry signals of a first carry input terminal and a second carry input terminal, a driver connected to the first power input terminal and to a third power input terminal for receiving a third power, and configured to control voltages of a first node and a second node, first outputs configured to receive one of scan clock signals or output enable scan signals based on a voltage of one of local nodes, connection portions configured to control an electrical connection between the local nodes and the first node in response to the voltage of the connection control line, and a reset connected between the connection control line and a fourth power input terminal for receiving a fourth power, and configured to control an electrical connection between the connection control line and the fourth power input terminal based on the voltage of the second node.

The stage circuit may further include a second output connected between a carry clock input terminal for receiving a carry clock signal and the third power input terminal, and configured to connect a carry output terminal to the carry clock input terminal or to the third power input terminal based on the voltages of the first node and the second node.

The second output may include a first carry transistor connected between the carry clock input terminal and the carry output terminal, and including a gate electrode connected to the first node, and a second carry transistor connected between the carry output terminal and the third power input terminal, and including a gate electrode connected to the second node.

The first power and the second power may include a positive voltage, wherein the third power and the fourth power include a negative voltage.

The second power may include a lower voltage than the first power.

The connection portions may be configured to block the electrical connection between the local nodes and the first node during a period in which the first outputs are configured to output at least one of the scan clock signals.

A period during which the first node has a first level voltage may include a first period and a second period, wherein the connection portions are configured to electrically connect the local nodes and the first node during the first period, and to electrically disconnect the local nodes from the first node during the second period after the first period.

The first level voltage may include a logic high level.

The first outputs may be configured to output at least one of the scan clock signals during the second period.

The first outputs may include a first output transistor connected between a scan clock input terminal for receiving one of the scan clock signals and one of output terminals, and including a gate electrode connected to the one of the local nodes, and a second output transistor connected between the fourth power input terminal and the one of the output terminals, and including a gate electrode connected to the second node.

The stage circuit may further include a booster connected to a boosting clock input terminal for receiving a boosting clock and to the third power input terminal, and configured to connect a voltage control line to the boosting clock input terminal or to the third power input terminal based on the voltages of the first node and the second node.

The booster may include a first boosting transistor connected between the boosting clock input terminal and the voltage control line, and including a gate electrode connected to the first node, a second boosting transistor connected between the voltage control line and the third power input terminal, and including a gate electrode connected to the second node, and a first capacitor connected between the first node and the voltage control line.

The connection portions may include a switching transistor connected between one of the local nodes and the first node, and including a gate electrode connected to the connection control line, and a boosting capacitor connected between the one of the local nodes and the voltage control line.

The controller may include a first control transistor connected between the first power input terminal and the connection control line, and including a gate electrode connected to the first carry input terminal, a second control transistor connected between the second power input terminal and the connection control line, and including a gate electrode connected to the voltage control line, and a third control transistor connected between the second power input terminal and the connection control line, and including a gate electrode connected to the second carry input terminal.

A carry signal of a previous stage circuit may be configured to be input to the first carry input terminal, wherein a carry signal of a next stage circuit is configured to be input to the second carry input terminal, and wherein, when the stage circuit is an $i^{th}$ stage circuit, i being a natural number that is greater than or equal to 1, the carry signal of the previous stage circuit includes an $(i-1)^{th}$ carry signal, and the carry signal of the next stage circuit is an $(i+1)^{th}$ carry signal.

The first control transistor may include transistors connected in series.

The controller may further include a fourth control transistor including transistors connected in series between the first power input terminal and the connection control line, and including a gate electrode connected to a reset input terminal.

In accordance with an aspect of the present disclosure, there is provided a display device including pixels connected to scan lines and to data lines, and a scan driver including stage circuits for driving the scan lines, at least one of the stage circuits including a driver for controlling voltages of a first node and a second node, first outputs configured to receive one of scan clock signals, and to output the one of the scan clock signals as an enable scan signal based on a voltage of one of local nodes, connection portions for controlling an electrical connection between the local nodes and the first node in response to a voltage of a connection control line, and a reset configured to supply a voltage at a logic low level to the connection control line based on a voltage of the second node.

The connection portions may be configured to block the electrical connection between the local nodes and the first node during a period in which the first outputs are configured to output the one of the scan clock signals.

In accordance with an aspect of the present disclosure, there is provided an electronic device including a processor, and a display device including pixels connected to scan lines and to data lines, and a scan driver configured to drive the scan lines and including a stage circuit including a driver for controlling voltages of a first node and a second node, first outputs configured to receive one of scan clock signals and to output the one of the scan clock signals as an enable scan signal based on a voltage of one of local nodes, connection portions for controlling an electrical connection between the local nodes and the first node in response to a voltage of a connection control line, and a reset configured to supply a voltage at a logic low level to the connection control line based on the voltage of the second node.

The present disclosure is not limited to the above, and other aspects not mentioned will be clearly understood by those skilled in the art from the following description.

DETAILED DESCRIPTION

Figure 1:
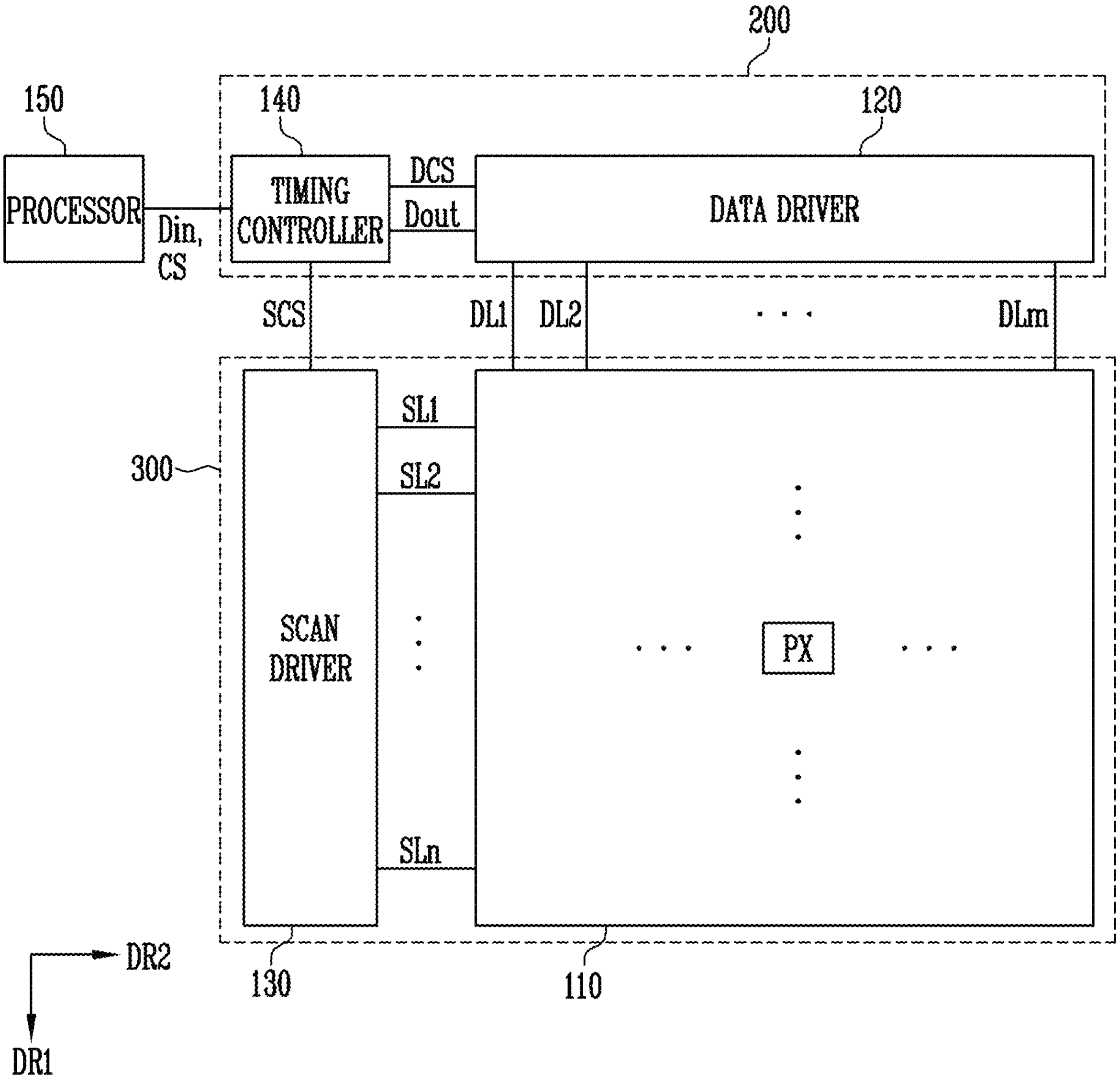
FIG. 1 is a diagram illustrating a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection.

For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device according to one or more embodiments of the present disclosure.

Referring to FIG. 1, the display device according to one or more embodiments of the present disclosure may include a display driver 200 and a display (e.g., display unit) 300.

The display driver 200 may control the display 300. To this end, the display driver 200 may include a timing controller 140 and a data driver 120. The display driver 200 may include one IC or a plurality of ICs. The display 300 may display an image (e.g., a predetermined image). To this end, the display 300 may include a pixel (e.g., pixel unit) 110 and a scan driver 130.

The timing controller 140 may receive input data Din and control signals CS corresponding to each frame from a processor 150. Here, the processor 150 may correspond to a Graphics Processing Unit (GPU), a Central Processing Unit (CPU), an Application Processor (AP), or the like. The control signals CS may include various signals suitable for driving the display device. The input data Din may correspond to an image displayed in the pixel 110.

The timing controller 140 may rearrange the input data Din to meet the specifications of the display device. In addition, the timing controller 140 may generate output data Dout by correcting the input data Din, and may supply the output data Dout to the data driver 120. For example, the timing controller 140 may generate the output data Dout by correcting the input data Din by reflecting the optical measurement result.

In one or more embodiments, the timing controller 140 may generate a data-driving signal DCS and a scan-driving signal SCS in response to the control signal CS. The data-driving signal DCS may be supplied to the data driver 120, and the scan-driving signal SCS may be supplied to the scan driver 130.

The pixel 110 may include a plurality of pixels PX that are positioned to be connected to scan lines SL1 to SLn (wherein n is a natural number of 3 or more) and data lines DL1 to DLm (wherein m is a natural number of 3 or more).

The data lines DL1 to DLm may be arranged to extend in a first direction DR1. The first direction DR1 may be, for example, a direction connecting an upper side and a lower side of the pixel 110. In contrast, the first direction DR1 may be a direction connecting a left side and a right side of the pixel 110, or may refer to a direction different therefrom.

The scan lines SL1 to SLn may be arranged to extend in a second direction DR2. The second direction DR2 may be a direction orthogonal to the first direction DR1. The second direction DR2 may be a direction connecting the left side and the right side of the pixel 110. In contrast, the second direction DR2 may be a direction connecting the upper side and the lower side of the pixel 110, or may refer to a direction different therefrom.

The plurality of pixels PX may be located in the pixel 110 to be electrically connected to the data lines DL1 to DLm and the scan lines SL1 to SLn. The pixels PX may be sub-pixels. For example, the pixels PX may be arranged in various ways that are currently known.

The pixels PX may be selected in units of horizontal lines (for example, the pixels PX connected to the same scan line may be classified into one horizontal line (or pixel row)) when a scan signal is supplied to the scan lines SL1 to SLn, and the pixels PX selected by the scan signal may receive a data signal from a data line (one of the data lines DL1 to DLm) connected thereto. The pixels PX supplied with the data signal may generate light of a luminance (e.g., predetermined luminance) in response to a voltage of the data signal.

The data driver 120 may receive the output data Dout and the data-driving signal DCS from the timing controller 140. The data driver 120 may generate a data signal based on the data-driving signal DCS and the output data Dout. For example, the data driver 120 may generate an analog data signal based on the gradation of the output data Dout. The data driver 120 may supply data signals in units of 1 horizontal period.

The scan driver 130 may receive the scan-driving signal SCS from the timing controller 140.

Figure 2:
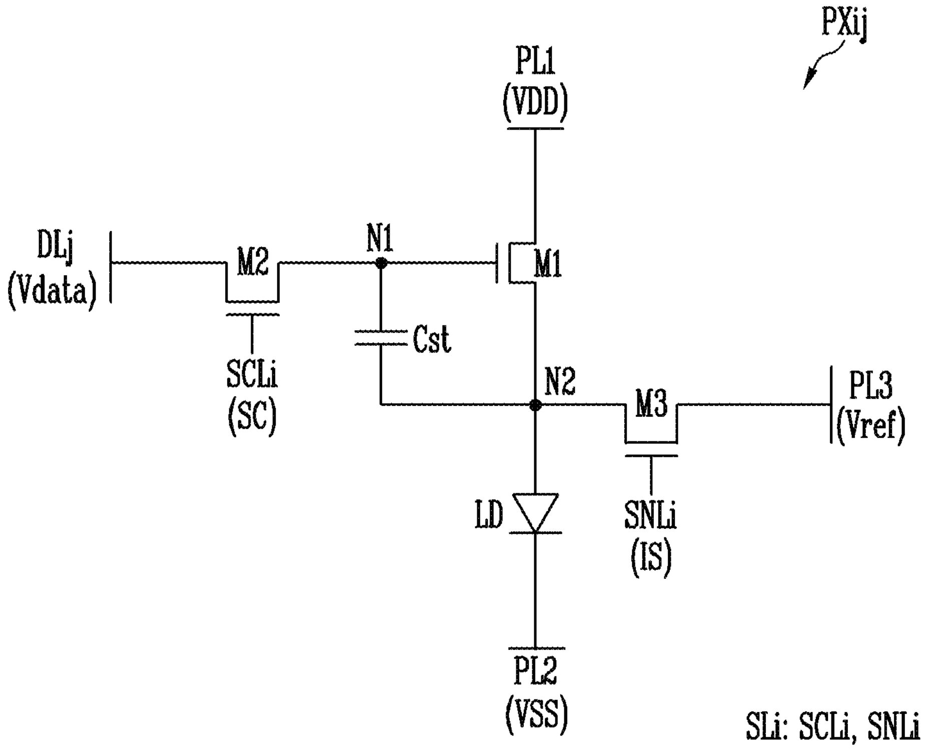
FIG. 2 is a circuit diagram illustrating one or more embodiments of a pixel shown in FIG. 1.

In one or more embodiments, each of the scan lines SL1 to SLn may include a scan line SCL and an initialization line SNL as shown in FIG. 2. The scan driver 130 may sequentially supply a first scan signal to the scan lines SCL in response to the scan-driving signal SCS. The scan driver 130 may sequentially supply a second scan signal to the initialization lines SNL in response to the scan-driving signal SCS.

To this end, in one or more embodiments, the scan driver 130 may include a first scan driver for driving the scan lines SCL, and a second scan driver for driving the initialization lines SNL. The first scan driver and the second scan driver may be formed of one scan driver 130 as shown in FIG. 1, or may be formed of separate drivers. For example, the first scan driver and the second scan driver may be located to be spaced apart from each other with the pixel 110 interposed therebetween.

In one or more embodiments, the scan driver 130 may be located on the display device as a separate integrated circuit. In one or more embodiments, the scan driver 130 may be formed together with the pixels PX in the process of forming the pixel 110.

In one or more embodiments of the present disclosure, the display device may include a planar display device, a curved display device in which a portion of the pixel 110 is bent, a flexible display device in which the portion may be folded or bent, and a stretchable display device in which the portion is stretched and contracted.

In one or more embodiments of the present disclosure, the display device is a device for displaying a moving image or a still image, and may include a mobile phone, a smart phone, a tablet personal computer (PC), a smart watch, a watch phone, a mobile communication terminal, an electronic notebook, an electronic book, a portable multimedia player (PMP), a navigation device, a portable electronic device, such as an ultra-mobile PC (UMPC), or the like. In one or more embodiments of the present disclosure, the display device may include an electronic device, such as a television, a notebook, a monitor, a billboard, or the Internet of Things (IoT).

FIG. 2 is a circuit diagram illustrating one or more embodiments of the pixel PX shown in FIG. 1. For convenience of description, a pixel PXij located on the i (where i is a natural number equal to or less than n and equal to or greater than 1) th horizontal line and j (where j is a natural number less than or equal to m and equal to or larger than 1) th vertical line.

Referring to FIG. 2, the pixel PXij according to one or more embodiments of the present disclosure may include a light-emitting device LD and a pixel circuit for controlling an amount of current supplied to the light-emitting device LD. For example, an ith scan line SLi may include an ith scan line SCLi and an ith initialization line SNLi.

A first electrode (or an anode electrode) of the light-emitting device LD may be connected to a first power line PL1 through a second node N2 and a first transistor M1, and a second electrode (or a cathode electrode) of the light-emitting device LD may be connected to a second power line PL2. The light-emitting device LD may generate light of a luminance (e.g., predetermined luminance) in response to the amount of current supplied from the first transistor M1.

The first power line PL1 may be supplied with a first driving power VDD, and the second power line PL2 may be supplied with a second driving power VSS. During the period in which the pixel PXij emits light, the first driving power VDD may have a higher voltage value than the second driving power VSS.

The light-emitting device LD may be selected as an organic light-emitting diode. In addition, the light-emitting device LD may be selected as an inorganic light-emitting diode, such as a micro-LED (light-emitting diode) or a quantum dot light-emitting diode. In addition, the light-emitting device LD may be a device composed of a combination of organic and inorganic materials. Although FIG. 2 illustrates that the pixel PX includes a single light-emitting device LD, in some embodiments, the pixel PX may include a plurality of light-emitting devices, and the plurality of light-emitting devices may be connected in series, in parallel, or in series and parallel with each other.

The pixel circuit may include the first transistor M1, a second transistor M2, a third transistor M3, and a storage capacitor Cst.

The first electrode of the first transistor M1 may be connected to the first power line PL1, and the second electrode may be connected to the second node N2. Here, connecting may include meaning of being electrically connected. The gate electrode of the first transistor M1 may be connected to the first node N1. The first transistor M1 may control the amount of current supplied from the first power line PL1 to the second power line PL2 via the light-emitting device LD in response to the voltage of the first node N1.

The second transistor M2 may be connected between a jth data line DLj and the first node N1. The gate electrode of the second transistor M2 may be electrically connected to the ith scan line SCLi. The second transistor M2 may be turned on when the enable first scan signal SC is supplied to the ith scan line SCLi and may electrically connect the jth data line DLj and the first node N1. When the second transistor M2 is turned on, a data signal from the jth data line DLj may be supplied to the first node N1.

The scan signal SC may have a gate on voltage (e.g., enable) or a gate off voltage (e.g., disable). Thereafter, the enable scan signal SC may indicate that the gate on voltage is supplied to the scan line SCL, and the disable scan signal SC may indicate that the gate off voltage is supplied to the scan line SCL.

The third transistor M3 may be connected between the second node N2 and a third power line PL3. The gate electrode of the third transistor M3 may be electrically connected to the ith initialization line SNLi. The third transistor M3 may be turned on when the enable second scan signal IS is supplied to the ith initialization line SNLi, and may electrically connect the second node N2 and the third power line PL3. When the third transistor M3 is turned on, the voltage of a reference power Vref from the third power supply line PL3 may be supplied to the second node N2.

The reference power Vref may be supplied to the third power line PL3. The voltage of the reference power Vref may be set such that the light-emitting device LD is turned off when supplied to the second node N2. To this end, the voltage difference between the reference power Vref and the second driving power VSS may be less than the threshold voltage of the light-emitting device LD. For example, the voltage of the reference power Vref may be set to a voltage that is the same as or similar to the voltage of the second driving power VSS.

The second scan signal IS may have a gate on voltage (e.g., enable) or a gate off voltage (e.g., disable). Thereafter, the enable second scan signal IS may indicate that the gate on voltage is supplied to the initialization line SNL, and the disable second scan signal IS may indicate that the gate off voltage is supplied to the initialization line SNL.

In FIG. 2, the first to third transistors M1 to M3 are illustrated as N-type transistors, but embodiments of the present disclosure are not limited thereto. For example, at least one of the first to third transistors M1 to M3 may be implemented as a P-type transistor.

The storage capacitor Cst may be connected between the first node N1 and the second node N2. The storage capacitor Cst may store a voltage corresponding to the data signal. For example, the storage capacitor Cst may store a voltage corresponding to the difference between the data signal supplied to the first node N1 and the reference power Vref supplied to the second node N2.

In addition, the structure of the pixel PXij is not limited to the one or more embodiments corresponding to FIG. 2. For example, the pixel PXij may be implemented by various types of circuits that are currently known.

To briefly explain the operation process, the enable first scan signal SC, and the enable second scan signal IS for being synchronized with the enable first scan signal SC, may be supplied.

When the enable second scan signal IS is supplied, the third transistor M3 may be turned on, and the voltage of the reference power Vref may be supplied to the second node N2. When the enable first scan signal SC is supplied, the second transistor M2 may be turned on, and the data signal may be supplied to the first node N1. In this case, a voltage corresponding to the difference between the data signal and the reference power Vref may be stored in the storage capacitor Cst.

The second transistor M2 may be turned off by the disable first scan signal SC, and the third transistor M3 may be turned off by the disable second scan signal IS. The first transistor M1 may supply a driving current (e.g., predetermined driving current) to the light-emitting device LD in response to the voltage stored in the storage capacitor Cst, and the light-emitting device LD may generate light having a luminance corresponding to the driving current.

In addition, during the sensing period, the voltage (or current) of the second node N2 may be supplied to the timing controller 140 via the third transistor M3, and the timing controller 140 may control the output data Dout to compensate for the threshold voltage, mobility, and/or degradation of the light-emitting device LD of the first transistor M1 in response to the voltage of the second node N2.

Figure 3:
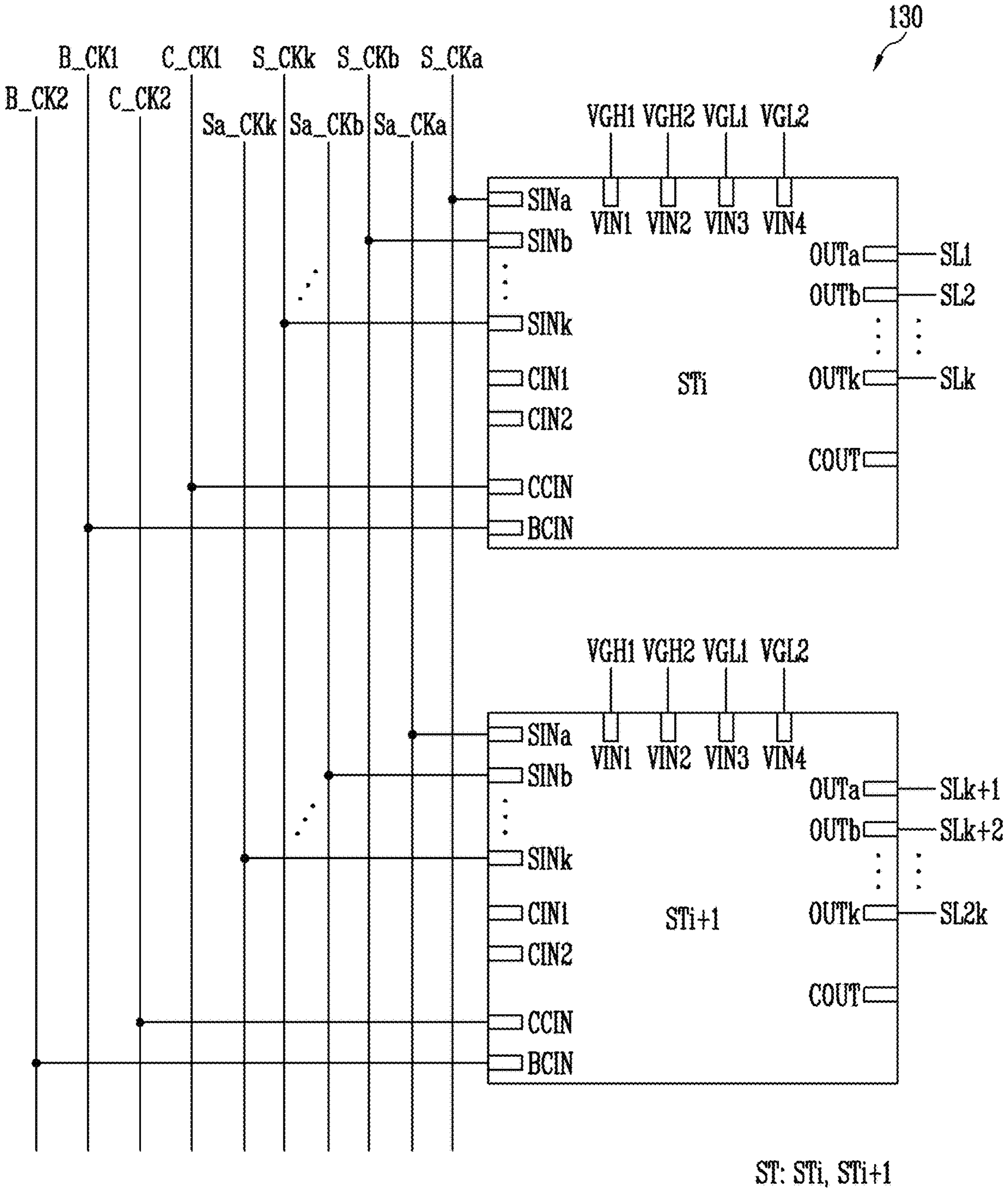
FIG. 3 is a diagram illustrating one or more embodiments of a scan driver shown in FIG. 1.

FIG. 3 is a diagram illustrating one or more embodiments of the scan driver 130 shown in FIG. 1. FIG. 3 illustrates an ith stage circuit STi and an i+1th stage circuit STi+1 for convenience of description.

Referring to FIG. 3, the scan driver 130 according to one or more embodiments of the present disclosure may include a plurality of stage circuits ST. Each of the stage circuits STi and STi+1 may be connected with the plurality of scan lines SL1, SL2, . . . , SLk or SLk+1, SLk+2, . . . , and SL2*k* (where k is a natural number greater than or equal to 2). Each of the scan lines SL1 to SLk or SLk+1 to SL2*k* may include at least one of the scan line SCL and the initialization line SNL shown in FIG. 2.

For example, when the scan driver 130 is the first scan driver, each of the scan lines SL1 to SLk or SLk+1 to SL2*k* may be the scan line SCL. For example, when the scan driver 130 is the second scan driver, each of the scan lines SL1 to SLk or SLk+1 to SL2*k* may be the initialization line SNL. For example, when the scan driver 130 includes the first scan driver and the second scan driver, each of the scan lines SL1 to SLk or SLk+1 to SL2*k* may include at least one of the scan line SCL and the initialization line SNL.

The ith stage circuit STi is connected to the k scan lines SL1 to SLk, and may supply the scan signal to the k scan lines SL1 to SLk. The i+1th stage circuit STi+1 may be connected to the k scan lines SLk+1 to SL2*k*, and may supply the scan signal to the k scan lines SLK+1 to SL2*k*. That is, in one or more embodiments of the present disclosure, the scan signal may be supplied to the plurality of scan lines by using one stage circuit, and thus the mounting area of the scan driver 130 may be minimized or reduced.

Each of the stage circuits STi and STi+1 may include power input terminals VIN1, VIN2, VIN3, and VIN4, scan clock input terminals SINa, SINb, . . . , and SINK, carry input terminals CIN1 and CIN2, a carry clock input terminal CCIN, a boosting clock input terminal BCIN, and a carry output terminal COUT. In one or more embodiments, the configuration of the input terminals and the output terminals of each of the stage circuits STi and STi+1 may be variously set corresponding to the configuration thereof.

A first power input terminal VIN1 may receive the voltage of a first power VGH1. The first power VGH1 is a positive voltage, and may have a logic high level voltage. A logic high level may refer to a voltage level at which the transistor supplied with the first power VGH1 is turned on. In addition, a logic low level may refer to a voltage level at which the transistor supplied with the corresponding power (or the voltage) is turned off. For example, the first power VGH1 may have a voltage of about 25 V.

A second power input terminal VIN2 may receive the voltage of a second power VGH2. The second power VGH2 is a positive voltage, and may have the logic high level voltage and the logic low level voltage. The transistor to which the second power VGH2 is supplied to the gate electrode may be turned on or off based on the voltage of the first electrode (or the second electrode). In one or more embodiments, the second power VGH2 may have a lower voltage than the first power VGH1, and for example, may have a voltage of about 15 V.

A third power input terminal VIN3 may receive the voltage of a third power VGL1. The third power VGL1 is a negative voltage and may have the logic low level voltage. The third power VGL1 may have a lower voltage than the second power VGH2.

A fourth power input terminal VIN4 may receive the voltage of a fourth power VGL2. The fourth power VGL2 is a negative voltage, and may have the logic low level voltage. The fourth power VGL2 may have a voltage that is lower than that of the second power VGH2, and that is higher than that of the third power VGL1.

Each of output terminals OUTa, OUTb, . . . , and OUTk may be connected to a respective one of the scan lines SL1 to SLk or SLk+1 to SL2*k*. The output terminals OUTa, OUTb, . . . , and OUTk may output the scan signal to one of the scan lines SL1 to SLk or SLk+1 to SL2*k* respectively connected thereto.

Each of the scan clock input terminals SINa, SINb, . . . , and SINk included in the odd-numbered stage circuit (e.g., the ith stage circuit STi) may receive one of scan clock signals S_CKa, S_CKb, . . . , or S_CKk. The scan clock signals S_CKa to S_CKk may be supplied to one of the output terminals OUTa to OUTk, and the scan clock signals S_CKa to S_CKk supplied to the output terminals OUTa to OUTk may be supplied as an enable scan signal to the scan lines SL1 to SLk.

Each of the scan clock input terminals SINa, SINb, . . . , and SINk included in the even-numbered stage circuit (e.g., the ith stage circuit STi+1) may receive one of scan clock signals Sa_CKa, Sa_CKb, . . . , or Sa_CKk. The scan clock signals Sa_CKa to Sa_CKk may be supplied to one of the output terminals OUTa to OUTk, and the scan clock signals Sa_CKa to Sa_CKk supplied to the output terminals OUTa to OUTk may be supplied as an enable scan signal to the scan lines SLk+1 to SL2*k*.

In FIG. 3, the scan clock signals S_CKa to S_CKk supplied to the odd-numbered stage circuit (e.g., the ith stage circuit STi) and the scan clock signals Sa_CKa to Sa_CKk supplied to the even-numbered stage circuit (e.g., the i+1th stage circuit STi+1) are shown as different signals, but the present disclosure is not limited thereto. For example, at least one of the scan clock signals supplied to the odd-numbered stage circuit (e.g., the ith stage circuit STi) and the even-numbered stage circuit (e.g., the i+1th stage circuit STi+1) may be shared.

The carry input terminals CIN1 and CIN2 may receive a carry signal from a previous stage circuit and a next stage circuit. For example, a first carry input terminal CIN1 included in the ith stage circuit STi may receive an i−1 carry signal (e.g., a first carry signal), and a second carry input terminal CIN2 may receive an i+1 carry signal (e.g., a second carry signal).

Figure 6:
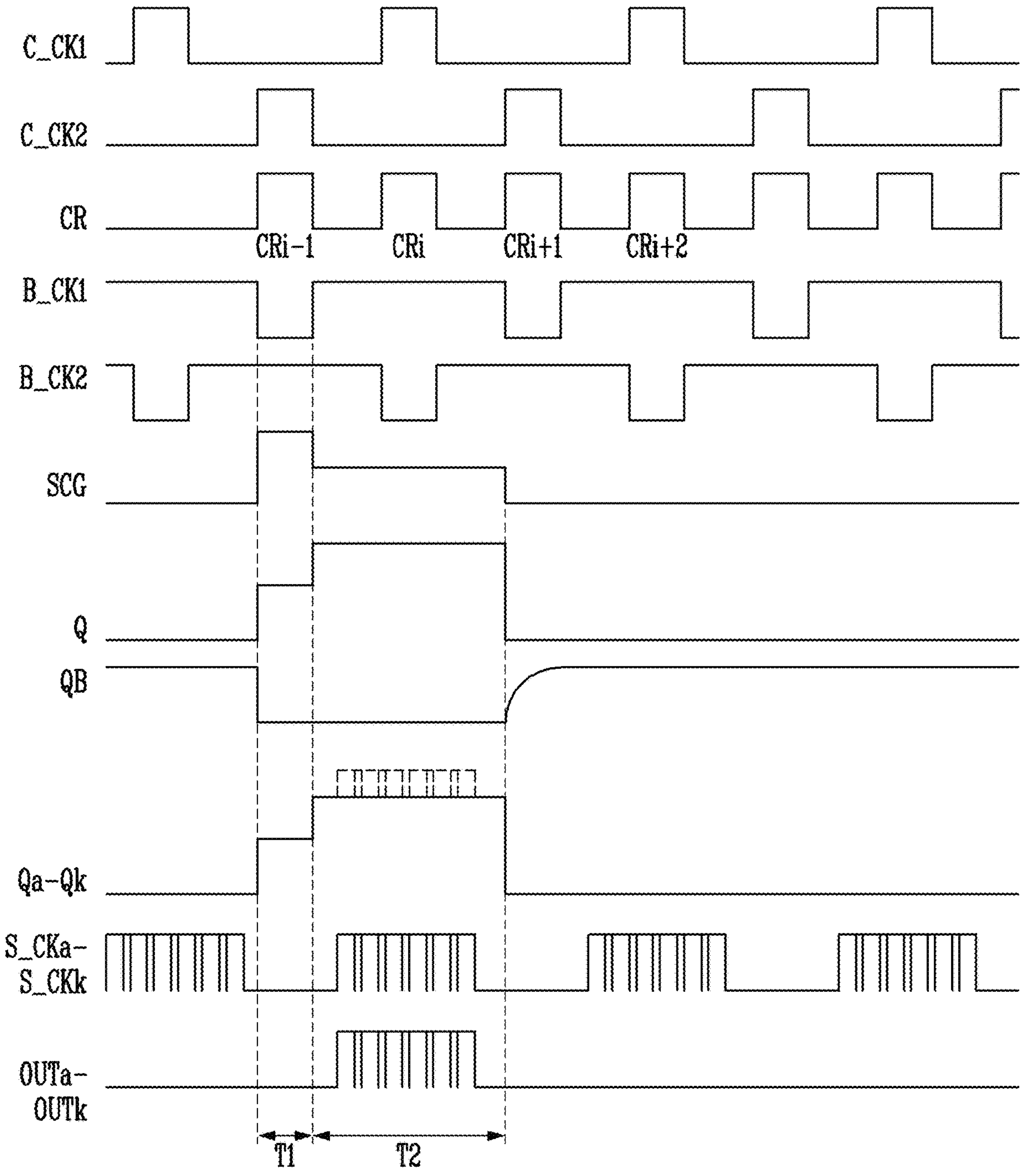
FIG. 6 is a waveform diagram illustrating one or more embodiments of a method of driving the stage circuit shown in FIG. 5.

The carry clock input terminal CCIN included in the odd-numbered stage circuit (e.g., the ith stage circuit STi) may receive a first carry clock signal C_CK1, and the carry clock input terminal CCIN included in the even-numbered stage circuit (e.g., the i+1th stage circuit STi+1) may receive a second carry clock signal C_CK2. As shown in FIG. 6, the first carry clock signal C_CK1 and the second carry clock signal C_CK2 may have the same period, and may have different phases. For example, the first carry clock signal C_CK1 and the second carry clock signal C_CK2 may have a phase difference of 180 degrees.

The boosting clock input terminal BCIN included in the odd-numbered stage circuit (e.g., the ith stage circuit STi) may receive a first boosting clock signal B_CK1, and the boosting clock input terminal BCIN included in the even-numbered stage circuit (e.g., the i+1th stage circuit STi+1) may receive a second boosting clock signal B_CK2. As shown in FIG. 6, the first boosting clock signal B_CK1 and the second boosting clock signal B_CK2 may have the same period and may have different phases. For example, the first boosting clock signal B_CK1 and the second boosting clock signal B_CK2 may have a phase difference of 180 degrees.

The carry output terminal COUT may output a carry signal. The carry output terminal COUT included in the ith stage circuit STi may output an $i^{th}$ carry signal. The carry output terminal COUT included in the i+1th stage circuit STi+1 may output an i+1 carry signal.

Figure 4:
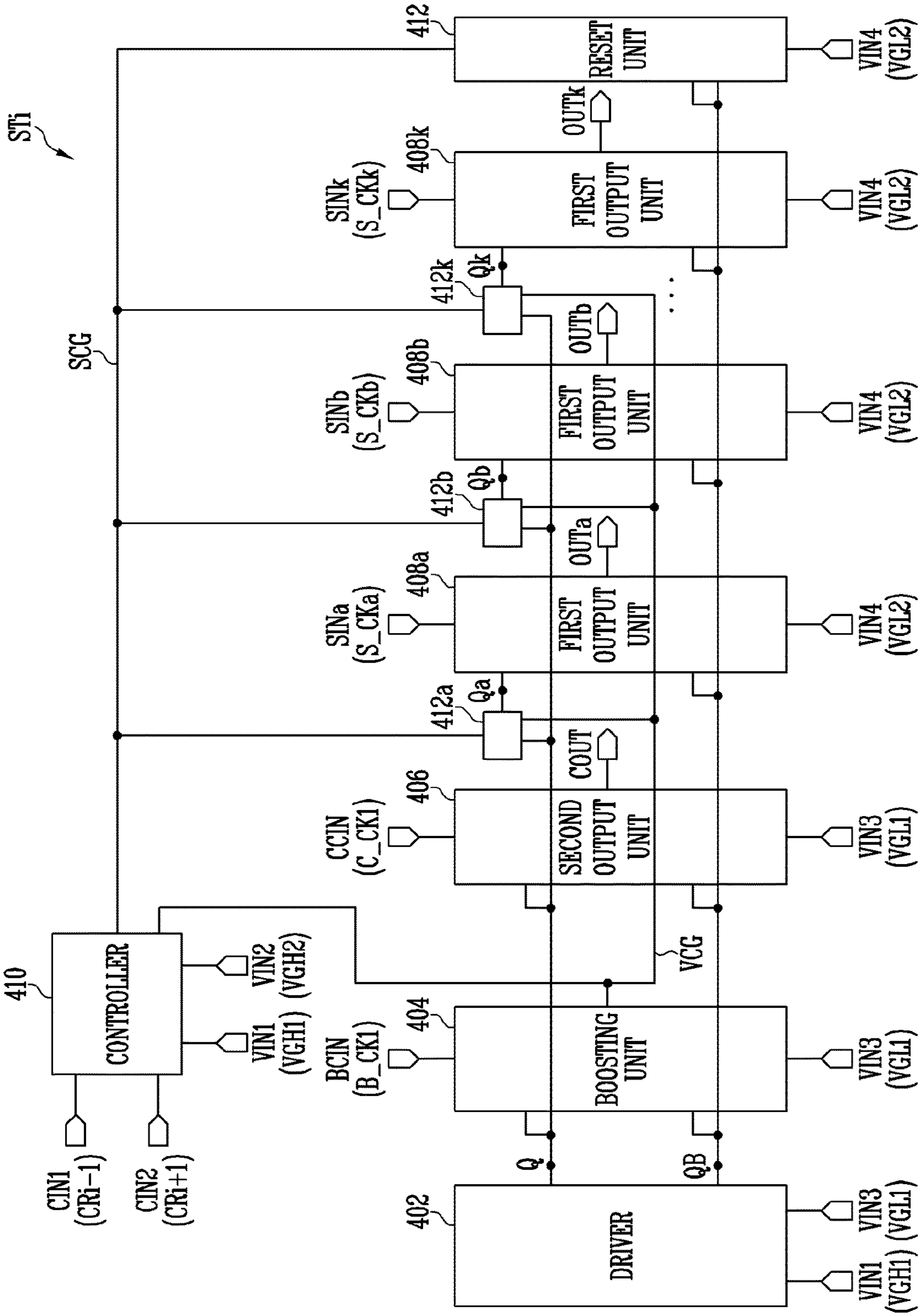
FIG. 4 is a block diagram of a stage circuit shown in FIG. 3.

FIG. 4 is a block diagram of the stage circuit shown in FIG. 3. FIG. 4 illustrates the ith stage circuit STi for convenience of description. The configuration of the i+1th stage circuit STi+1 may be substantially the same as that of the ith stage circuit STi.

Referring to FIG. 4, the ith stage circuit STi according to one or more embodiments of the present disclosure may include a driver 402, a booster (e.g., boosting unit) 404, first outputs (e.g., first output units) 408*a*, 408*b*, . . . , and 408*k*, a second output (e.g., a second output unit) 406, connectors (e.g., connection units) 412*a*, 412*b*, . . . , and 412*k*, a controller 410, and a reset (e.g., reset unit) 412.

The driver 402 may be connected to the first power input terminal VIN1 and the third power input terminal VIN3, and may control the voltages of a first node Q and a second node QB.

In one or more embodiments, the driver 402 may control the voltages of the first node Q and the second node QB in response to a start signal or the carry signal, and may be configured with various currently known circuits. The input terminals connected to the driver 402 may be variously configured to correspond to the circuit structure of the driver 402.

The second output 406 may be connected to the carry clock input terminal CCIN, the third power input terminal VIN3, and the carry output terminal COUT. The second output 406 may output the carry signal to the carry output terminal COUT in response to voltages of the first node Q and the second node QB.

The booster 404 may be connected to the boosting clock input terminal BCIN, the third power input terminal VIN3, and a voltage control line VCG. The booster 404 may output a boosting signal to the voltage control line VCG in response to the voltages of the first node Q and the second node QB. The voltage control line VCG may be electrically connected to the connectors 412*a*, 412*b*, . . . , and 412*k*.

Each of the first outputs 408*a*, 408*b*, . . . , and 408*k* may be connected to one of the scan clock input terminals SINa, SINb, . . . , and SINK, one of the output terminals OUTa, OUTb, . . . , and OUTk, and the fourth power input terminal VIN4. Each of the first outputs 408*a*, 408*b*, . . . , and 408*k* may be connected to the first node Q via one of local nodes Qa, Qb, . . . , Qk, and one of the connectors 412*a*, 412*b*, . . . , and 412*k*. The first outputs 408*a*, 408*b*, . . . , and 408*k* may supply the scan signal to the output terminals OUTa, OUTb, . . . , and OUTk based on the voltages of the local nodes Qa, Qb, . . . , Qk (or the first node Q1).

Each of the connectors 412*a*, 412*b*, . . . , 412*k* may be connected between the first node Q and the local nodes Qa, Qb, . . . , Qk. Each of the connectors 412*a*, 412*b*, . . . , 412*k* may electrically connect the first node Q and the local nodes Qa, Qb, . . . , Qk during a first period T1 in which the first node Q has a first level (for example, the logic high level voltage), and may electrically disconnect the first node Q from the local nodes Qa, Qb, . . . , Qk during a second period T2 after the first period T1 in which the first node Q has a second level.

The second period T2 may be a period in which the enable scan signal is output from the first outputs 408*a*, 408*b*, . . . , and 408*k*. Each of the connectors 412*a*, 412*b*, . . . , 412*k* may electrically block the first node Q and the local nodes Qa, Qb, . . . , Qk during a period in which the enable scan signal is output from the first outputs 408*a*, 408*b*, . . . , and 408*k*, and thus luminance variation in units of horizontal lines may be reduced or prevented.

In other words, when the first node Q and the local nodes Qa, Qb, . . . , Qk are electrically disconnected during the second period T2 in which the enable scan signal is output from the first outputs 408*a*, 408*b*, . . . , and 408*k*, a voltage of the first node Q may be changed when the scan signal is output at the first outputs 408*a*, 408*b*, . . . , and 408*k*. For example, the voltage of the first node Q may be changed in response to the order of supply of the scan signals, whether the scan signals overlap, or the like.

When the voltage of the first node Q is changed, the voltages of the local nodes Qa, Qb, . . . , and Qk may be changed. When the voltages of the local nodes Qa, Qb, . . . , and Qk are changed during the second period T2, the scan signal having different voltages may be output from the first outputs 408*a*, 408*b*, . . . , and 408*k*, and thus luminance variation in units of horizontal lines may occur.

In one or more embodiments of the present disclosure, the first outputs 408*a*, 408*b*, . . . , and 408*k* and the first node Q may be electrically disconnected during the second period T2 in which the scan signal is output by using the connectors 412*a*, 412*b*, . . . , 412*k*.

For example, a voltage of the local node Qa may be changed when the scan signal is output from the first output 408*a*, the voltage of the local node Qb may be changed when the scan signal is output from the first output 408*b*, and the voltage of the Local node Qk may be changed when the scan signal is output from the first output 408*k*. The amount of voltage changes of the local nodes Qa, Qb, . . . , and Qk may be substantially the same, and accordingly, the first outputs 408*a*, 408*b*, . . . , and 408*k* may output scan signals having substantially the same voltage.

In other words, in one or more embodiments of the present disclosure, the voltage of the first node Q is not changed by the voltages of the local nodes Qa, Qb, . . . , and Qk during the second period T2. Therefore, in one or more embodiments of the present disclosure, luminance variation in units of horizontal lines may be reduced or prevented.

The controller (e.g., control unit) 410 may be connected to the connectors 412*a*, 412*b*, . . . , and 412*k* via a connection control line SCG. The controller 410 may be connected to the first carry input terminal CIN1, the second carry input terminal CIN2, the first power input terminal VIN1, and the second power input terminal VIN2. The controller 410 may control a voltage of the connection control line SCG in response to the carry signal input to the first carry input terminal CIN1 and the second carry input terminal CIN2.

The connectors 412*a*, 412*b*, . . . , and 412*k* may control the electrical connection between the local nodes Qa, Qb, . . . , and Qk and the first node Q in response to the voltage of the connection control line SCG. For example, the connectors 412*a*, 412*b*, . . . , and 412*k* may electrically connect the local nodes Qa, Qb, . . . , and Qk and the first node Q when the connection control line SCG is at the logic high level, and may electrically disconnect the local nodes Qa, Qb, . . . , and Qk and the first node Q when the connection control line SCG is at the logic low level.

The reset 412 may be connected to the connection control line SCG and the fourth power input terminal VIN4. The reset 412 may control the electrical connection between the connection control line SCG and the fourth power input terminal VIN4 based on a voltage of the second node QB. For example, the reset 412 may supply the logic low level voltage to the connection control line SCG based on the voltage of the second node QB.

Figure 5:
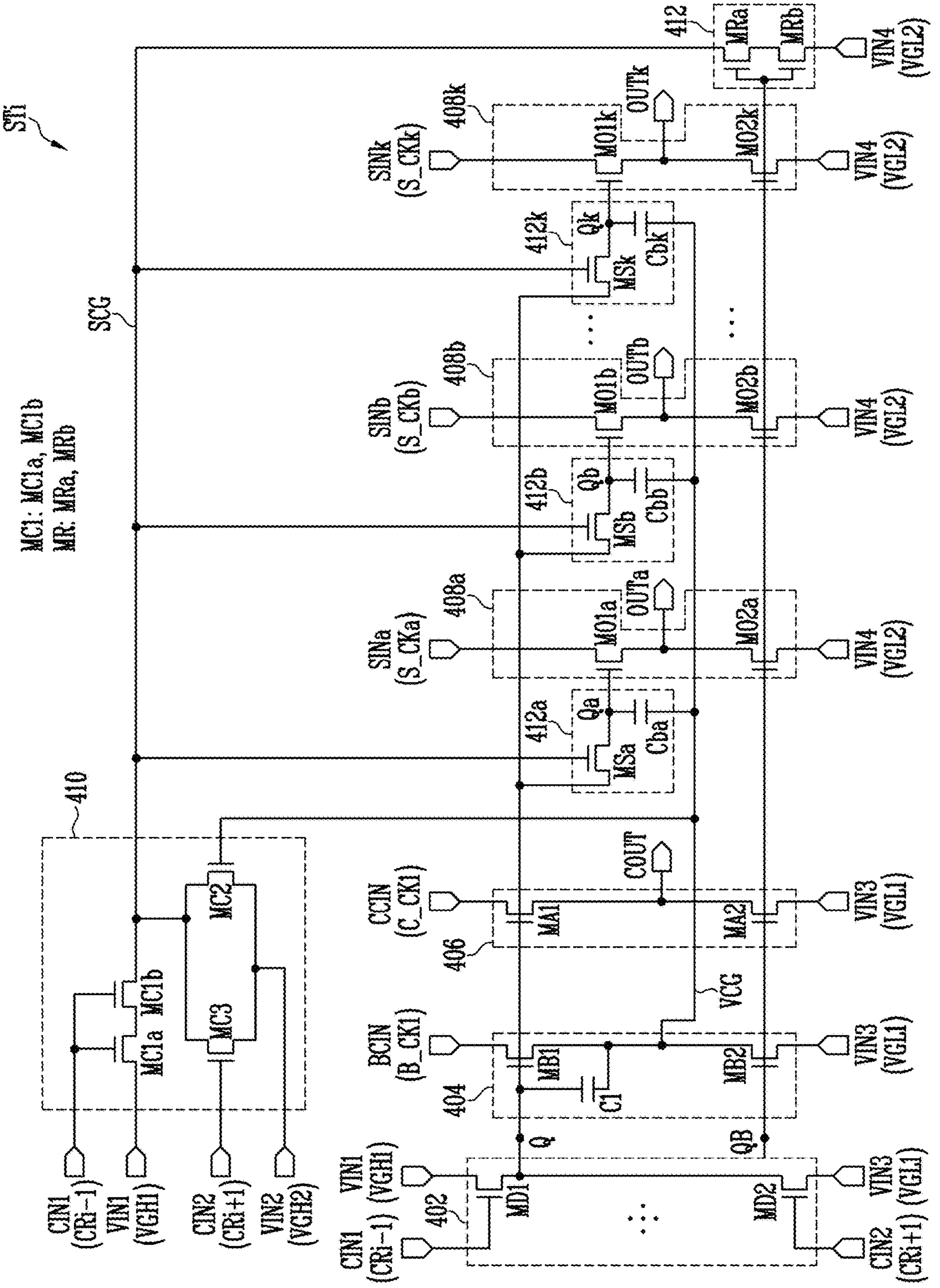
FIG. 5 is a diagram illustrating one or more embodiments of a circuit corresponding to each of the blocks illustrated in FIG. 4.

FIG. 5 is a diagram illustrating one or more embodiments of a circuit corresponding to each of the blocks illustrated in FIG. 4. As shown in FIG. 4, the driver 402 may be implemented in various currently known forms, and accordingly, only some configurations included in the driver 402, will be shown.

Referring to FIG. 5, the driver 402 is connected to the first power input terminal VIN1 and the third power input terminal VIN3, and may control the voltages of the first node Q and the second node QB in response to a first carry signal CRi−1 input to the first carry input terminal CIN1 and a second carry signal CRi+1 input to the second carry input terminal CIN2. However, the present disclosure is not limited thereto, and the driver 402 may be implemented by various currently known circuits. For example, the driver 402 may include an inverter that controls the voltage of the second node QB to be a voltage that is opposite to the voltage of the first node Q.

The driver 402 may include a first driving transistor MD1 and a second driving transistor MD2.

The first driving transistor MD1 may be connected between the first power input terminal VIN1 and the first node Q, and a gate electrode of the first driving transistor MD1 may be connected to the first carry input terminal CIN1. The first driving transistor MD1 may be turned on when the first carry signal CRi−1 is input to the first carry input terminal CIN1, and may supply a voltage of the first power VGH1 to the first node Q.

The second driving transistor MD2 may be connected between the third power input terminal VIN3 and the first node Q, and a gate electrode of the second driving transistor MD2 may be connected to the second carry input terminal CIN2. The second driving transistor MD2 may be turned on when the second carry signal CRi+1 is input to the second carry input terminal CIN2, and may supply the voltage of the third power VGL1 to the first node Q.

In one or more embodiments, the driver 402 may further include a transistor that supplies the voltage of the third power VGL1 to the second node QB when the first carry signal CRi−1 is input to the first carry input terminal CIN1.

The booster 404 may electrically connect the voltage control line VCG to the boosting clock input terminal BCIN or the third power input terminal VIN3 in response to the voltages of the first node Q and the second node QB. The boosting signal may be output when the first boosting clock signal B_CK1 is supplied to the voltage control line VCG. The boosting signal supplied to the voltage control line VCG may boost the voltages of the first node Q and the local nodes Qa, Qb, . . . , and Qk.

The booster 404 may include a first boosting transistor MB1, a second boosting transistor MB2, and a first capacitor C1.

The first boosting transistor MB1 may be connected between the boosting clock input terminal BCIN and the voltage control line VCG, and a gate electrode of the first boosting transistor MB1 may be connected to the first node Q. The first boosting transistor MB1 may control the electrical connection between the boosting clock input terminal BCIN and the voltage control line VCG in response to the voltage of the first node Q.

The second boosting transistor MB2 may be connected between the voltage control line VCG and the third power input terminal VIN3, and a gate electrode of the second boosting transistor MB2 may be connected to the second node QB. The second boosting transistor MB2 may control the electrical connection between the voltage control line VCG and the third power input terminal VIN3 in response to the voltage of the second node QB.

The second output 406 may electrically connect the carry output terminal COUT to the carry clock input terminal CCIN or the third power input terminal VIN3 in response to the voltages of the first node Q and the second node QB. When the first carry clock signal C_CK1 is output to the carry output terminal COUT, the carry signal (e.g., the $i^{th}$ carry signal) may output.

The second output 406 may include a first carry transistor MA1 and a second carry transistor MA2.

The first carry transistor MA1 may be connected between the carry clock input terminal CCIN and the carry output terminal COUT, and a gate electrode of the first carry transistor MA1 may be connected to the first node Q. The first carry transistor MA1 may control the electrical connection between the carry clock input terminal CCIN and the carry output terminal COUT in response to the voltage of the first node Q.

The second carry transistor MA2 may be connected between the carry output terminal COUT and the third power input terminal VIN3, and a gate electrode of the second carry transistor MA2 may be connected to the second node QB. The second carry transistor MA2 may control the electrical connection between the carry output terminal COUT and the third power input terminal VIN3 in response to the voltage of the second node QB.

The first outputs 408*a*, 408*b*, . . . , and 408*k* may be connected to one of the scan clock input terminals SINa, SINb, . . . , and SINK, one of the output terminals OUTa, OUTb, . . . , and OUTk, and the fourth power input terminal VIN4. Each of the first outputs 408*a*, 408*b*, . . . , and 408*k* may include one of first output transistors MO1*a*, MO1*b*, . . . , and MO1*k*, and one of second output transistors MO2*a*, MO2*b*, . . . , and MO2*k*.

Gate electrodes of the first output transistors MO1*a*, MO1*b*, . . . , and MO1*k* may be connected to one of the local nodes Qa, Qb, . . . , and Qk. Gate electrodes of the second output transistors MO2*a*, MO2*b*, . . . , and MO2*k* may be electrically connected to the second node QB.

In one or more embodiments, the first output 408*a* may electrically connect the output terminal OUTa to the scan clock input terminal SINa or the fourth power input terminal VIN4 in response to the voltages of the local node Qa and the second node QB. The enable scan signal may be output when the scan clock signal S_CKa is supplied to the output terminal OUTa. The enable scan signal supplied to the output terminal OUTa may be supplied to the scan line (e.g., the scan line SL1) connected to itself. The first output 408*a* may include the first output transistor MO1*a* and the second output transistor MO2*a*.

The first output transistor MO1*a* may be connected between the scan clock input terminal SINa and the output terminal OUTa. The gate electrode of the first output transistor MO1*a* may be connected to the connector 412*a* via the local node Qa. The first output transistor MO1*a* may control the electrical connection between the scan clock input terminal SINa and the output terminal OUTa in response to the voltage of the local node Qa.

The second output transistor MO2*a* may be connected between the output terminal OUTa and the fourth power input terminal VIN4, and the gate electrode of the second output transistor MO2*a* may be connected to the second node QB. The second output transistor MO2*a* may control the electrical connection between the output terminal OUTa and the fourth power input terminal VIN4 in response to the voltage of the second node QB.

In one or more embodiments, the first output 408*b* may electrically connect the output terminal OUTb to the scan clock input terminal SINb or the fourth power input terminal VIN4 in response to the voltages of the local node Qb and the second node QB. The first output 408*b* may include the first output transistor MO1*b* and the second output transistor MO2*b*.

The first output transistor MO1*b* may be connected between the scan clock input terminal SINb and the output terminal OUTb. The gate electrode of the first output transistor MO1*b* may be connected to the connector 412*b* via the local node Qb. The first output transistor MO1*b* may control the electrical connection between the scan clock input terminal SINb and the output terminal OUTb in response to the voltage of the local node Qb.

The second output transistor MO2*b* may be connected between the output terminal OUTb and the fourth power input terminal VIN4, and the gate electrode of the second output transistor MO2*b* may be connected to the second node QB. The second output transistor MO2*b* may control the electrical connection between the output terminal OUTb and the fourth power input terminal VIN4 in response to the voltage of the second node QB.

In one or more embodiments, the first output 408*k* may electrically connect the output terminal OUTk to the scan clock input terminal SINk or the fourth power input terminal VIN4 in response to voltages of the local node Qk and the second node QB. The first output 408*k* may include the first output transistor MO1*k* and the second output transistor MO2*k*.

The first output transistor MO1*k* may be connected between the scan clock input terminal SINK and the output terminal OUTk. The gate electrode of the first output transistor MO1*k* may be connected to the connector 412*k* via the local node Qk. The first output transistor MO1*k* may control the electrical connection between the scan clock input terminal SINK and the output terminal OUTk in response to the voltage of the local node Qk.

The second output transistor MO2*k* may be connected between the output terminal OUTk and the fourth power input terminal VIN4, and the gate electrode of the second output transistor MO2*k* may be connected to the second node QB. The second output transistor MO2*k* may control the electrical connection between the output terminal OUTk and the fourth power input terminal VIN4 in response to the voltage of the second node QB.

Each of the connectors 412*a*, 412*b*, . . . , and 412*k* may be connected between the first node Q and a respective one of the local nodes Qa, Qb, . . . , and Qk. The connectors 412*a*, 412*b*, . . . , and 412*k* may control the electrical connection between the first node Q and the local nodes Qa, Qb, . . . , and Qk in response to the voltage of the connection control line SCG. The connectors 412*a*, 412*b*, . . . , and 412*k* may each include a respective one of switching transistors MSa, MSb, . . . , and MSk and a respective one of boosting capacitors Cba, Cbb, . . . , and Cbk.

Each of the switching transistors MSa, MSb, . . . , and MSk may be connected between the first node Q and one of the local nodes Qa, Qb, . . . , and Qk. A gate electrode of each of the switching transistors MSa, MSb, . . . , and MSk may be connected to the connection control line SCG. The switching transistors MSa, MSb, . . . , and MSk may control the electrical connection between the first node Q and the local nodes Qa, Qb, . . . , and Qk in response to the voltage of the connection control line SCG.

Each of the boosting capacitors Cba, Cbb, . . . , Cbk may be connected between a respective one of the local nodes Qa, Qb, . . . , Qk and the voltage control line VCG. The boosting capacitors Cba, Cbb, . . . , and Cbk may respectively control the voltages of the local nodes Qa, Qb, . . . , and Qk in response to a voltage of the voltage control line VCG.

The controller 410 may control the voltage of the connection control line SCG in response to the carry signals CRi−1 and CRi+1 respectively input to the first and second carry input terminals CIN1 and CIN2.

The controller 410 may include a first control transistor MC1, a second control transistor MC2, and a third control transistor MC3.

The first control transistor MC1 may be connected between the first power input terminal VIN1 and the connection control line SCG, and a gate electrode of the first control transistor MC1 may be connected to the first carry input terminal CIN1. The first control transistor MC1 may be turned on when the first carry signal CRi−1 is input to the first carry input terminal CIN1, so that the voltage of the first power VGH1 may be supplied to the connection control line SCG. The first control transistor MC1 may include a plurality of transistors MC1*a* and MC1*b* connected in series so that leakage current is reduced.

The second control transistor MC2 may be connected between the second power input terminal VIN2 and the connection control line SCG, and a gate electrode of the second control transistor MC2 may be connected to the voltage control line VCG. The second control transistor MC2 may supply the voltage of the second power VGH2 to the connection control line SCG while being turned on or off in response to the voltage of the voltage control line VCG.

The third control transistor MC3 may be connected between the second power input terminal VIN2 and the connection control line SCG, and a gate electrode of the third control transistor MC3 may be connected to the second carry input terminal CIN2. The third control transistor MC3 may be turned on when the second carry signal CRi+1 is input to the second carry input terminal CIN2 to supply the voltage of the second power VGH2 to the connection control line SCG.

The reset 412 may control the electrical connection between the fourth power input terminal VIN4 and the connection control line SCG in response to the voltage of the second node QB. The reset 412 may include a reset transistor MR.

The reset transistor MR may be connected between the fourth power input terminal VIN4 and the connection control line SCG, and a gate electrode of the reset transistor MR may be connected to the second node QB. The reset transistor MR may control the electrical connection between the fourth power input terminal VIN4 and the connection control line SCG in response to the voltage of the second node QB. The reset transistor MR may include a plurality of transistors MRa and MRb connected in series.

The transistors included in the ith stage circuit STi may include N-type transistors, but the present disclosure is not limited thereto. In addition, at least some of the transistors included in the ith stage circuit STi may include a plurality of transistors connected in series.

Figure 7A:
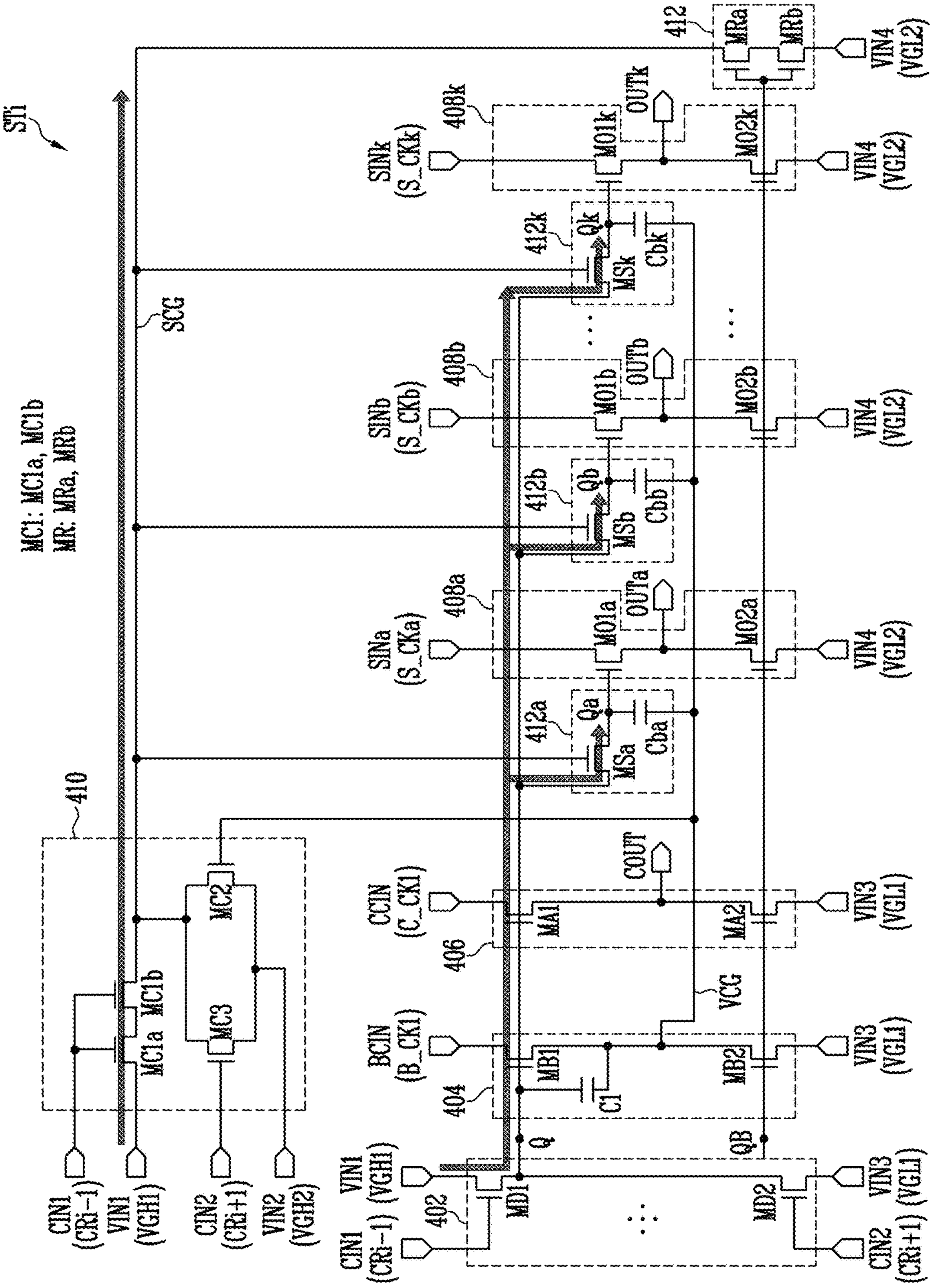
FIGS. 7A to 7C are diagrams illustrating an operation process of a stage circuit corresponding to the driving waveform of FIG. 6.
Figure 7B:
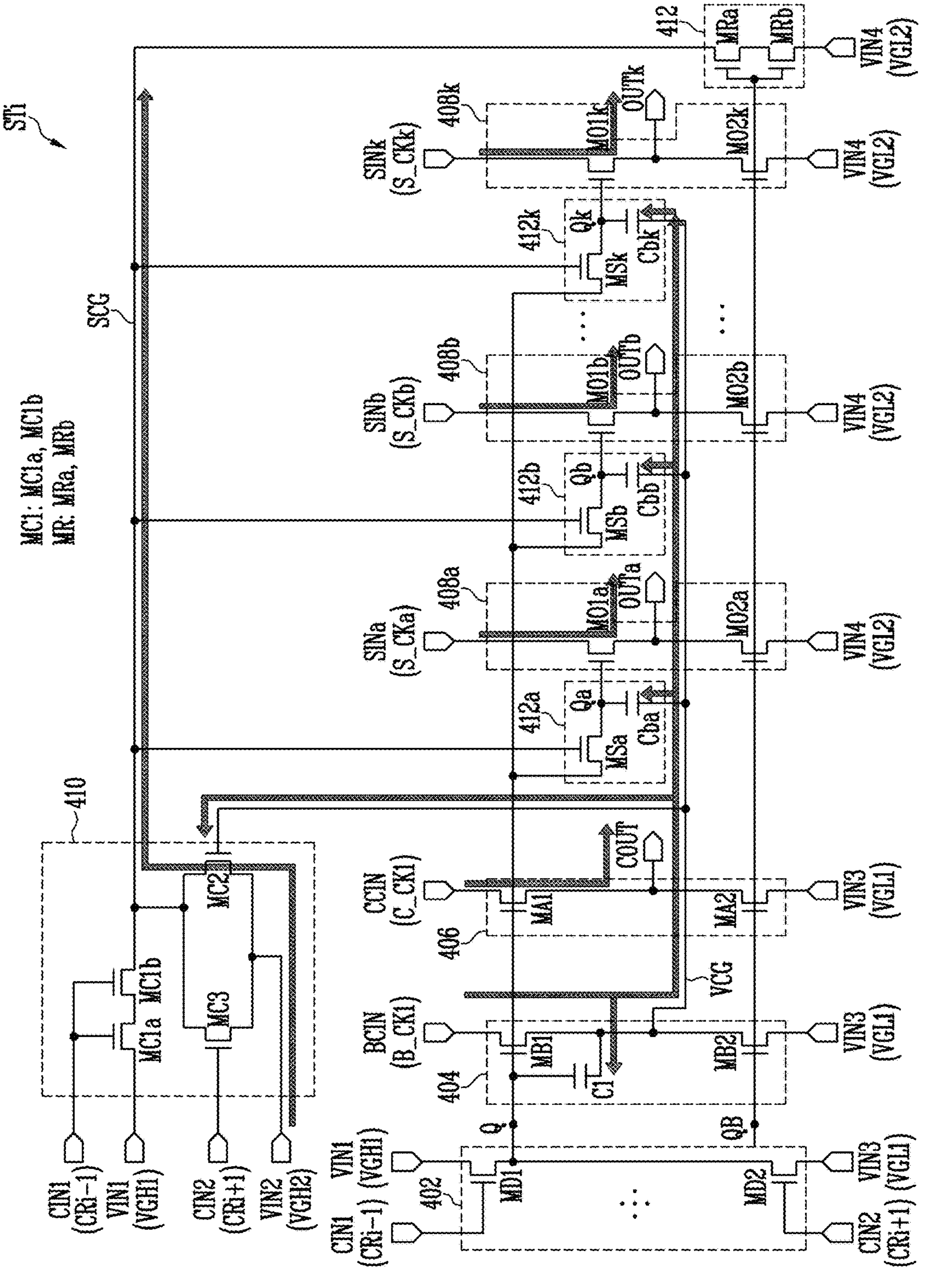
Figure 7C:
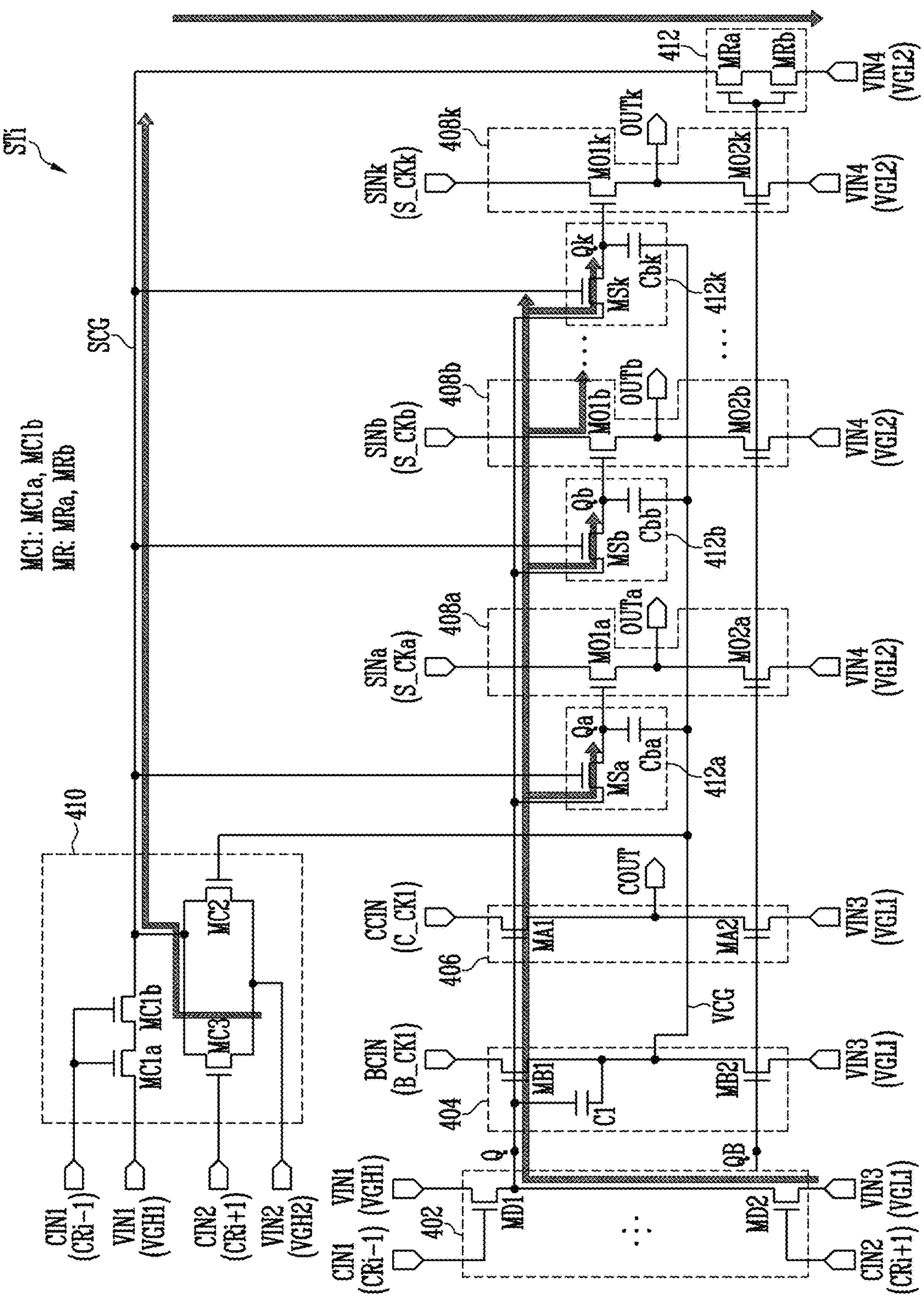

FIG. 6 is a waveform diagram illustrating one or more embodiments of a method of driving the stage circuit shown in FIG. 5. FIGS. 7A to 7C are diagrams illustrating an operation process of the stage circuit corresponding to the driving waveform of FIG. 6. The part indicated by S_CKa-S_CKk in FIG. 6 may refer to the scan clock signals S_CKa to S_CKk. Some portion of the scan clock signals S_CKa to S_CKk are illustrated as being overlapped, but the present disclosure is not limited thereto. For example, the scan clock signals S_CKa to S_CKk may be supplied so as not to overlap.

Referring to FIG. 6, the first and second carry clock signals C_CK1 and C_CK2 may have the same period, and may a phase difference of 180 degrees. The first boosting clock signal B_CK1 and the second boosting clock signal B_CK2 may have the same period, and may have a phase difference of 180 degrees. The carry clock signals C_CK1 and C_CK2 and the boosting clock signals B_CK1 and B_CK2 may have the same period.

The high voltage (e.g., the logic high level) of the carry clock signals C_CK1 and C_CK2 during one period may be supplied for a shorter time than the low voltage (e.g., the logic low level). The low voltage (e.g., the logic low level) of the boosting clock signals B_CK1 and B_CK2 during one period may be supplied for a shorter time than the high voltage (e.g., the logic high level).

The low voltage of the first boosting clock signal B_CK1 may at least partially overlap with the low voltage of the first carry clock signal C_CK1, and the high voltage of the first boosting clock signal B_CK1 may at least partially overlap with the high voltage of the first carry clock signal C_CK1. The low voltage of the first boosting clock signal B_CK1 may at least partially overlap with the high voltage of the second carry clock signal C_CK2, and the high voltage of the first boosting clock signal B_CK1 may at least partially overlap with the low voltage of the second carry clock signal C_CK2.

The carry signal CR: CRi−1, CRi, CRi+1, CRi+2, . . . , or the like may be set to a high voltage (e.g., the logic high level), and may be synchronized with the high voltages of the carry clock signals C_CK1 and C_CK2. For example, the stage circuits ST may output the high voltages of the carry clock signals C_CK1 and C_CK2 to the carry signals CR: CRi−1, CRi, CRi+1, CRi+2, . . . , or the like.

Referring to FIGS. 6 and 7A, the first carry signal CRi−1 (e.g., the logic high level) may be input to the first carry input terminal CIN1 during the first period T1. When the first carry signal CRi−1 is input to the first carry input terminal CIN1, the first driving transistor MD1 and the first control transistor MC1 may be turned on.

When the first driving transistor MD1 is turned on, the voltage (e.g., the high voltage) of the first power VGH1 may be supplied to the first node Q. The second node QB may be the low voltage.

When the high voltage is supplied to the first node Q1, the first boosting transistor MB1 and the first carry transistor MA1 may be turned on. When the first boosting transistor MB1 is turned on, the boosting clock input terminal BCIN may be electrically connected to the voltage control line VCG. When the first carry transistor MA1 is turned on, the carry clock input terminal CCIN may be electrically connected to the carry output terminal COUT.

When the first control transistor MC1 is turned on, the voltage of the first power VGH1 may be supplied to the connection control line SCG. When the high voltage (e.g., the voltage of the first power VGH1) is supplied to the connection control line SCG, the switching transistors MSa, MSb, . . . , and MSk may be turned on. When the switching transistors MSa, MSb, . . . , and MSk are turned on, the high voltage of the first node Q may be supplied to the local nodes Qa, Qb, . . . , and Qk. When the high voltage is supplied to the local nodes Qa, Qb, . . . , and Qk, the first output transistors MO1*a*, MO1*b*, . . . , and MO1*k* may be turned on.

Referring to FIGS. 6 and 7B, the first boosting clock signal B_CK1 at a high level may be input to the boosting clock input terminal BCIN during the second period T2. The first boosting clock signal B_CK1 at the high level may be supplied to the voltage control line VCG via the first boosting transistor MB1 as a boosting signal. Therefore, the voltage control line VCG may be raised from the low voltage to the high voltage by the boosting signal.

When the voltage of the voltage control line VCG is increased by the boosting signal, the voltage of the first node Q may be increased by the first capacitor C1. For example, the voltage of the first node Q may be increased to a voltage approximately twice as high as that of the first power VGH1.

When the voltage of the voltage control line VCG is raised by the boosting signal, the voltage of the local nodes Qa, Qb, . . . , and Qk may be raised by the boosting capacitors Cba, Cbb, . . . , and Cbk. For example, the local nodes Qa, Qb, . . . , and Qk may be raised to the voltage approximately twice as high as the first power VGH1. When the voltage of the local nodes Qa, Qb, . . . , and Qk rises to a voltage higher than the first power VGH1, the first output transistors MO1*a*, MO1*b*, . . . , and MO1*k* may be stably maintained in the turn on state during the second period T2.

When the voltage of the voltage control line VCG is raised by the boosting signal, the second control transistor MC2 may be turned on. When the second control transistor MC2 is turned on, the voltage of the second power VGH2 may be supplied to the connection control line SCG. The voltage of the second power VGH2 supplied to the connection control line SCG may be supplied to the gate electrodes of the switching transistors MSa, MSb, . . . , and MSk.

The first electrode and the second electrode of each of the switching transistors MSa, MSb, . . . , and MSk are set to a higher voltage than the first power VGH1. Therefore, when the voltage of the second power VGH2, which is lower than that of the first power VGH1, is supplied to the gate electrodes of the switching transistors MSa, MSb, . . . , and MSk, the switching transistors MSA, MSb, and MSK may be turned off.

During the second period T2, the scan clock signals S_CKa, S_CKb, . . . , and S_CKk at a high level may be input to the scan clock input terminals SINa, SINb, . . . and SINK. Because the first output transistors MO1*a*, MO1*b*, . . . , and MO1*k* remain turned on, the scan clock signals S_CKa, S_CKb, . . . , and S_CKk at the high level may be supplied to the output terminals OUTa, OUTb, . . . , and OUTk as an enable scan signal.

During the second period T2 in which the enable scan signal is output to the output terminals OUTa, OUTb, . . . , and OUTk, the switching transistors MSa, MSb, . . . , and MSk may remain turned off, and accordingly, an image having substantially uniform luminance may be displayed in the pixel 110.

In other words, when the switching transistors MSa, MSb, . . . , and MSk are not provided, the voltages of the first node Q and the local nodes Qa, Qb, . . . , and Qk may be changed by parasitic capacitors of the first output transistors MO1*a*, MO1*b*, . . . , and MO1*k* during the second period T2 in which the enable scan signal is output. For example, the first node Q and the local nodes Qa, Qb, . . . , and Qk may have different voltages corresponding to the order of supply of the enable scan signal, and accordingly, a luminance difference may be generated in units of horizontal lines.

On the other hand, when the local nodes Qa, Qb, . . . , and Qk and the first node Q are electrically disconnected by the switching transistors MSa, MSb, . . . , and MSk during the period in which the enable scan signal is output as in the present disclosure, the first node Q may maintain a constant voltage. In addition, the local nodes Qa, Qb, . . . , and Qk may change substantially the same voltage by the output of the enable scan signal, thereby reducing or preventing occurrence of a luminance difference in units of horizontal lines.

In one or more embodiments of the present disclosure, the switching transistors MSa, MSb, . . . , and MSk may be turned off by using the voltage of the second power VGH2, which is the positive voltage, during the second period T2. In this case, the Vgs voltage difference of the switching transistors MSa, MSb, . . . , and MSk may remain low, and accordingly, the driving stability may be ensured by reducing or minimizing the stress of the switching transistors MSa, MSb, . . . , and MSk.

Referring to FIGS. 6 and 7C, the second carry signal CRi+1 may be input to the second carry input terminal CIN2 after the second period T2. When the second carry signal CRi+1 is input to the second carry input terminal CIN2, the second driving transistor MD2 and the third control transistor MC3 may be turned on.

When the second driving transistor MD2 is turned on, the voltage of the third power VGL1 (or the low voltage) may be supplied to the first node Q. Then, the second node QB may be raised to a high voltage in response to the voltage of the first node Q. For example, the second node QB may be raised to the high voltage by the low voltage of the first node Q via an inverter or the like, and in this case, the second node QB may be gradually raised to the high voltage by the loading of circuit elements connected to the second node Qb.

When the third control transistor MC3 is turned on, the voltage of the second power VGH2 may be supplied to the connection control line SCG. Because the first node Q is set to the voltage of the third power VGL1, the switching transistors MSa, MSb, . . . , and MSk may be turned on. When the switching transistors MSa, MSb, . . . , and MSk are turned on, the local nodes Qa, Qb, . . . , and Qk may have the low voltage.

On the other hand, because the voltage of the second node QB gradually rises to the high voltage, the reset transistor MR may be turned on after the local nodes Qa, Qb, . . . , and Qk are set to the low voltage. When the reset transistor MR is turned on, the voltage of the fourth power VGL2 may be supplied to the connection control line SCG.

The second node QB may maintain the high voltage for a period other than the first period T1 and the second period T2, and accordingly, the connection control line SCG may maintain the voltage of the fourth power VGL2. When the fourth power VGL2 is supplied to the connection control line SCG, the switching transistors MSa, MSb, . . . , and MSk are turned off, and accordingly, the local nodes Qa, Qb, . . . , and Qk may maintain the low voltage.

The stage circuit ST according to embodiments of the present disclosure may be driven by receiving the first carry signal CRi−1 as the previous stage carry signal and the second carry signal CRi+1 as the next stage carry signal. When the next stage carry signal is the i+1$^{th}$ carry signal CRi+1, adding unnecessary dummy stages may be reduced or minimized. In addition, when the next stage carry signal is the i+1$^{th}$ carry signal CRi+1, the sensing time (or sensing period) of the pixels PX may be secured.

For example, when the i+2 carry signal or more carry signals are used as the next stage carry signal, dummy stages should be additionally formed. In addition, it may be difficult to secure the sensing period when the i+2$^{th}$ carry signal is used as the next-stage carry signal.

Figure 8:
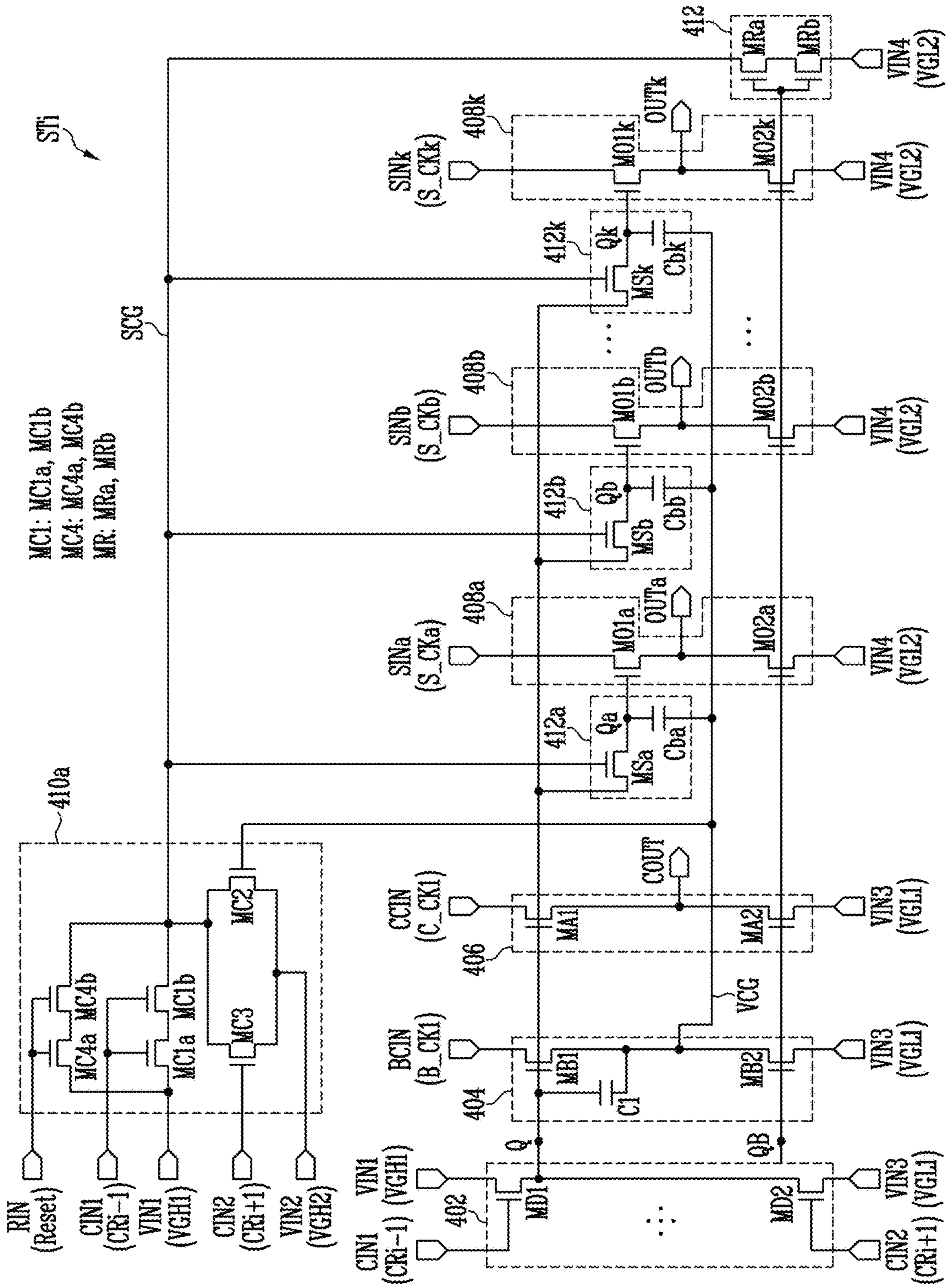
FIG. 8 is a diagram illustrating one or more embodiments of a circuit corresponding to each of the blocks illustrated in FIG. 4.

FIG. 8 is a diagram illustrating one or more embodiments of the circuit corresponding to each of the blocks illustrated in FIG. 4. In descriptions of FIG. 8, overlapping explanations for the same elements as those in FIG. 5 will be omitted.

Referring to FIG. 8, a controller 410*a* may include the first control transistor MC1, the second control transistor MC2, the third control transistor MC3, and a fourth control transistor MC4.

The fourth control transistor MC4 may be connected between the first power input terminal VIN1 and the connection control line SCG, and a gate electrode of the fourth control transistor MC4 may be connected to a reset input terminal RIN. The fourth control transistor MC4 may be turned on when the reset signal Reset is input to the reset input terminal RIN to supply the voltage of the first power VGH1 to the connection control line SCG. The fourth control transistor MC4 may be include a plurality of transistors MC4*a* and MC4*b* connected in series so that leakage current is reduced.

The reset input terminal RIN may be commonly connected to all the stage circuits ST. The reset signal Reset may be supplied to set the connection control line SCG at the voltage of the first power supply VGH1, and the supply timing may be controlled as suitable.

Figure 9:
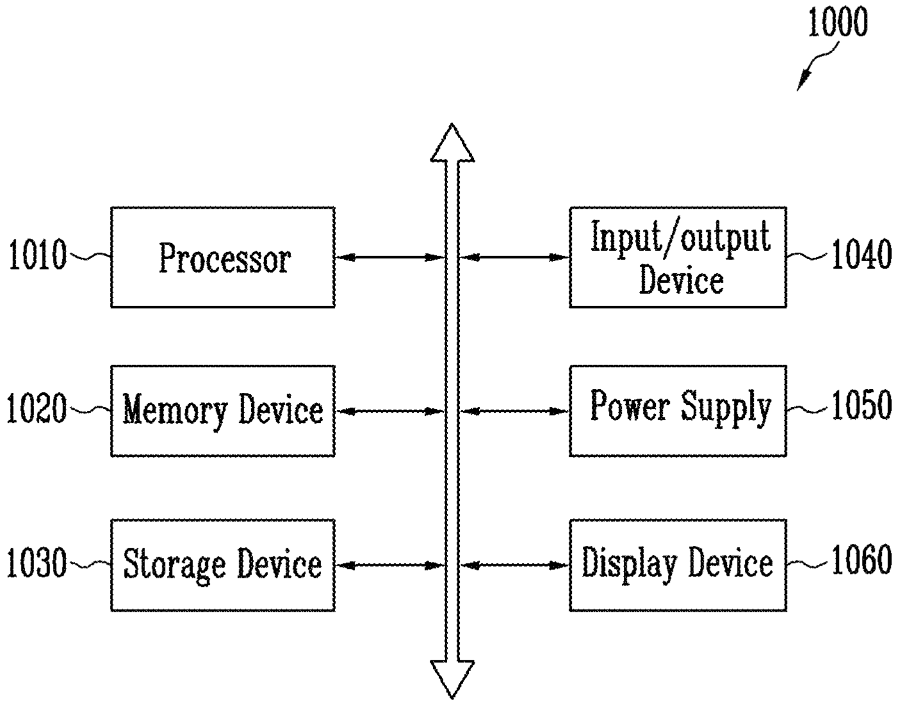
FIG. 9 is a block diagram illustrating one or more embodiments of an electronic device including the display device of FIG. 1.
Figure 10:
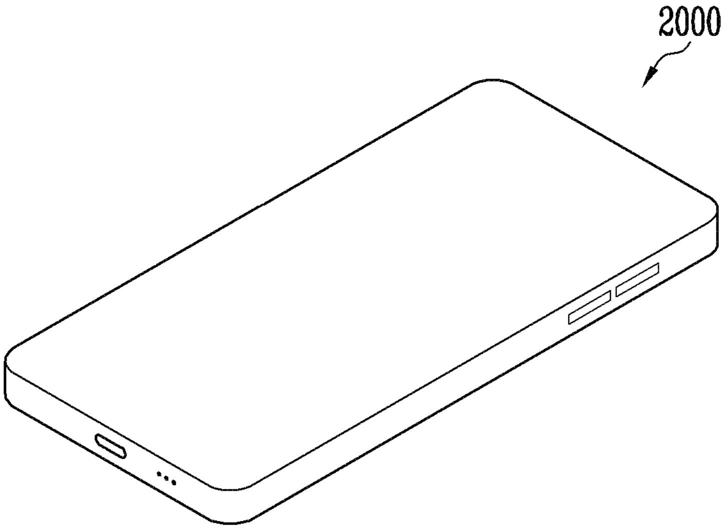
FIG. 10 is a perspective view illustrating an example of a smartphone that may be implemented using the electronic device of FIG. 9.
Figure 11:
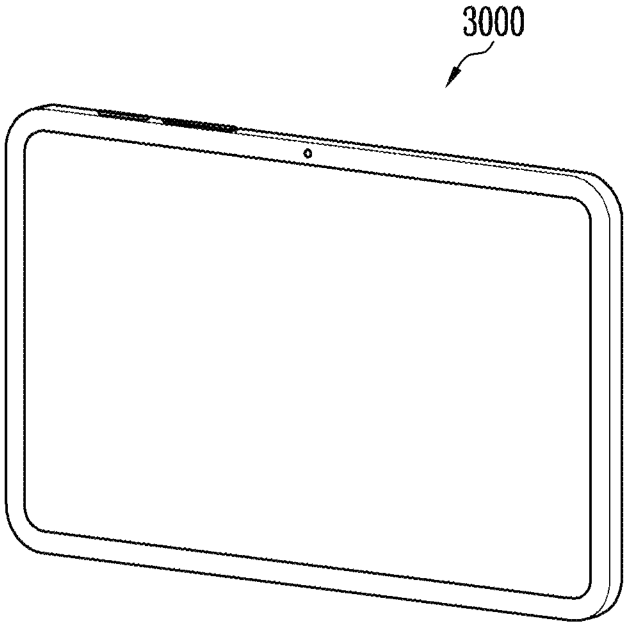
FIG. 11 is a perspective view illustrating an example of a tablet computer that may be implemented using the electronic device of FIG. 9.

FIG. 9 is a block diagram illustrating one or more embodiments of an electronic device 1000 including the display device of FIG. 1. FIG. 10 is a perspective view illustrating an example of a smartphone that may be implemented using the electronic device 1000 of FIG. 9. FIG. 11 is a perspective view illustrating an example of a tablet computer that may be implemented using the electronic device 1000 of FIG. 9.

Referring to FIG. 9, the electronic device 1000 may include a processor 1010, a memory device 1020, a storage device 1030, an input/output device 1040, a power supply 1050, and a display device 1060.

In some embodiments, as shown in FIG. 10, the electronic device 1000 may be implemented as a smartphone 2000. In other embodiments, as shown in FIG. 11, the electronic device 1000 may be implemented as a tablet computer 3000. However, this mere an example, and the electronic device 1000 is not limited thereto. For example, the electronic device 1000 may be a computer device or an electronic device including the display device 1060, such as a digital television, a 3D TV, a personal computer (PC), a home electronic device, a laptop computer, a mobile phone, a video phone, a smart pad, a smart watch, a head mounted display device, a personal digital assistant (PDA), a portable multimedia player (PMP), a digital camera, a music player, a portable game console, navigation, or the like.

The processor 1010 may perform various tasks and calculations. In some embodiments, the processor 1010 may include an application processor, a graphics processing unit, a microprocessor, a central processing unit (CPU), and the like. The processor 1010 may be connected to other components of the electronic device 1000 through a bus system. In some embodiments, the bus system may include a Peripheral Component Interconnect (PCI) bus. The processor 1010 may provide a data stream to be displayed on the display device 1060. The data stream may be provided to the display device 1060 as the input data Din of FIG. 1. The processor 1010 may further transmit the control signals CS of FIG. 1 to the display device 1060.

The memory device 1020 may be provided as a working memory and/or a buffer memory of the electronic device 1000 and/or the processor 1010. In some embodiments, the memory device 1020 may include volatile memory devices, such as dynamic random access memory (DRAM), static random access memory (SRAM), mobile DRAM, and the like.

The storage device 1030 may store data in response to the control of the processor 1010. The storage device 1030 may include a non-volatile storage medium that maintains data even when the electronic device 1000 is powered down. In some embodiments, the storage device 1030 may include a solid state drive (SSD), a hard disk drive (HDD), or the like.

The input/output device 1040 may include user input devices, such as a keyboard, keypad, touchpad, touchscreen, mouse, and the like, and output devices, such as a speaker, printer, or the like.

The power supply 1050 may supply power suitable for the operation of the electronic device 1000. For example, the power supply 1050 may be a power management integrated circuit (PMIC). For example, the power supply 1050 may include a battery. In one or more embodiments, the power supply 1050 may be located inside the display device 1060. In one or more embodiments, the power supply 1050 may be located outside the display device 1060.

The display device 1060 may display an image in response to the control of the processor 1010. The display device 1060 may be connected to other components of the electronic device 1000 via a bus system and/or other communication links. The display device 1060 may be the display device of FIG. 1. The display device 1060 may include the scan driver 130 illustrated in FIG. 3. The display device 1060 may include the stage circuit illustrated in one of FIGS. 4, 5, and 8.

According to a stage circuit and a display device including the stage circuit according to the embodiments of the present disclosure, outputs that are configured to output an enable scan signal based on a voltage of a first node are electrically disconnected from the first node when the enable scan signal is output, thereby reducing or preventing the occurrence of a luminance difference in units of horizontal lines.

In addition, the stage circuit according to the embodiments of the present disclosure is driven by a carry signal of a next stage circuit, thereby reducing the dead space and securing the sensing time of pixels.

Although the above has been described with reference to the embodiments of the disclosure, those skilled in the art will understand that the disclosure may be variously modified and changed without departing from the spirit and scope of the disclosure described in the claims, with functional equivalents thereof to be included therein.

What is claimed is:

1. A stage circuit comprising:

a controller connected to a first power input terminal for receiving a first power and to a second power input terminal for receiving a second power, and configured to control a voltage of a connection control line in response to carry signals of a first carry input terminal and a second carry input terminal;

a driver connected to the first power input terminal and to a third power input terminal for receiving a third power, and configured to control voltages of a first node and a second node;

first outputs configured to receive one of scan clock signals or output enable scan signals based on a voltage of one of local nodes;

connection portions configured to control an electrical connection between the local nodes and the first node in response to the voltage of the connection control line; and a reset connected between the connection control line and a fourth power input terminal for receiving a fourth power, and configured to control an electrical connection between the connection control line and the fourth power input terminal based on the voltage of the second node.

2. The stage circuit of claim 1, further comprising a second output connected between a carry clock input terminal for receiving a carry clock signal and the third power input terminal, and configured to connect a carry output terminal to the carry clock input terminal or to the third power input terminal based on the voltages of the first node and the second node.

3. The stage circuit of claim 2, wherein the second output comprises:

a first carry transistor connected between the carry clock input terminal and the carry output terminal, and comprising a gate electrode connected to the first node; and a second carry transistor connected between the carry output terminal and the third power input terminal, and comprising a gate electrode connected to the second node.

4. The stage circuit of claim 1, wherein the first power and the second power comprise a positive voltage, and wherein the third power and the fourth power comprise a negative voltage.

5. The stage circuit of claim 4, wherein the second power comprises a lower voltage than the first power.

6. The stage circuit of claim 1, wherein the connection portions are configured to block the electrical connection between the local nodes and the first node during a period in which the first outputs are configured to output at least one of the scan clock signals.

7. The stage circuit of claim 1, wherein a period during which the first node has a first level voltage comprises a first period and a second period, and wherein the connection portions are configured to electrically connect the local nodes and the first node during the first period, and to electrically disconnect the local nodes from the first node during the second period after the first period.

8. The stage circuit of claim 7, wherein the first level voltage comprises a logic high level.

9. The stage circuit of claim 7, wherein the first outputs are configured to output at least one of the scan clock signals during the second period.

10. The stage circuit of claim 1, wherein the first outputs comprise:

a first output transistor connected between a scan clock input terminal for receiving one of the scan clock signals and one of output terminals, and comprising a gate electrode connected to the one of the local nodes; and a second output transistor connected between the fourth power input terminal and the one of the output terminals, and comprising a gate electrode connected to the second node.

11. The stage circuit of claim 1, further comprising a booster connected to a boosting clock input terminal for receiving a boosting clock signal and to the third power input terminal, and configured to connect a voltage control line to the boosting clock input terminal or to the third power input terminal based on the voltages of the first node and the second node.

12. The stage circuit of claim 11, wherein the booster comprises:

a first boosting transistor connected between the boosting clock input terminal and the voltage control line, and comprising a gate electrode connected to the first node;

a second boosting transistor connected between the voltage control line and the third power input terminal, and comprising a gate electrode connected to the second node; and a first capacitor connected between the first node and the voltage control line.

13. The stage circuit of claim 11, wherein the connection portions comprise:

a switching transistor connected between one of the local nodes and the first node, and comprising a gate electrode connected to the connection control line; and a boosting capacitor connected between the one of the local nodes and the voltage control line.

14. The stage circuit of claim 11, wherein the controller comprises:

a first control transistor connected between the first power input terminal and the connection control line, and comprising a gate electrode connected to the first carry input terminal;

a second control transistor connected between the second power input terminal and the connection control line, and comprising a gate electrode connected to the voltage control line; and a third control transistor connected between the second power input terminal and the connection control line, and comprising a gate electrode connected to the second carry input terminal.

15. The stage circuit of claim 14, wherein a carry signal of a previous stage circuit is configured to be input to the first carry input terminal, wherein a carry signal of a next stage circuit is configured to be input to the second carry input terminal, and wherein, when the stage circuit is an $i^{th}$ stage circuit, i being a natural number that is greater than or equal to 1, the carry signal of the previous stage circuit comprises an $(i-1)^{th}$ carry signal, and the carry signal of the next stage circuit is an $(i+1)^{th}$ carry signal.

16. The stage circuit of claim 14, wherein the first control transistor comprises transistors connected in series.

17. The stage circuit of claim 14, wherein the controller further comprises a fourth control transistor comprising transistors connected in series between the first power input terminal and the connection control line, and comprising a gate electrode connected to a reset input terminal.

18. A display device comprising:

pixels connected to scan lines and to data lines; and a scan driver comprising stage circuits for driving the scan lines, at least one of the stage circuits comprising:

a driver for controlling voltages of a first node and a second node;

first outputs configured to receive one of scan clock signals, and to output the one of the scan clock signals as an enable scan signal based on a voltage of one of local nodes that are distinct from the first node and from the second node;

connection portions for controlling an electrical connection between the local nodes and the first node in response to a voltage of a connection control line; and a reset configured to supply a voltage at a logic low level to the connection control line based on a voltage of the second node.

19. The display device of claim 18, wherein the connection portions are configured to block the electrical connection between the local nodes and the first node during a period in which the first outputs are configured to output the one of the scan clock signals.

20. An electronic device comprising:

a processor; and a display device comprising pixels connected to scan lines and to data lines, and a scan driver configured to drive the scan lines and comprising a stage circuit comprising:

a driver for controlling voltages of a first node and a second node;

first outputs configured to receive one of scan clock signals and to output the one of the scan clock signals as an enable scan signal based on a voltage of one of local nodes that are distinct from the first node and from the second node;

connection portions for controlling an electrical connection between the local nodes and the first node in response to a voltage of a connection control line; and a reset configured to supply a voltage at a logic low level to the connection control line based on the voltage of the second node.

* * * * *